United States Patent
Queiroz

(10) Patent No.: US 11,595,295 B2
(45) Date of Patent: Feb. 28, 2023

(54) SYSTEM AND METHOD FOR DISTRIBUTING PACKETS IN A NETWORK

(71) Applicant: Cambridge Broadband Networks Group Limited, Cambridge (GB)

(72) Inventor: Tiago Queiroz, Cambridge (GB)

(73) Assignee: CAMBRIDGE BROADBAND NETWORKS GROUP LIMITED, Cambridge (GB)

( * ) Notice: Subject to any disclaimer, the term of this patent is extended or adjusted under 35 U.S.C. 154(b) by 61 days.

(21) Appl. No.: 17/053,973

(22) PCT Filed: May 10, 2019

(86) PCT No.: PCT/GB2019/051289
§ 371 (c)(1),
(2) Date: Nov. 9, 2020

(87) PCT Pub. No.: WO2019/215455
PCT Pub. Date: Nov. 14, 2019

(65) Prior Publication Data
US 2021/0273877 A1    Sep. 2, 2021

(30) Foreign Application Priority Data
May 11, 2018 (GB) ..................................... 1807694

(51) Int. Cl.
*H04L 45/12*   (2022.01)
*H04L 43/106*   (2022.01)
(Continued)

(52) U.S. Cl.
CPC .......... *H04L 45/123* (2013.01); *H04L 43/106* (2013.01); *H04L 45/245* (2013.01);
(Continued)

(58) Field of Classification Search
CPC ... H04L 45/123; H04L 43/106; H04L 45/245; H04L 47/125; H04L 47/41; H04L 47/562; H04L 47/34
See application file for complete search history.

(56) References Cited

U.S. PATENT DOCUMENTS 6,178,448 B1 * 1/2001 Gray ....................... H04L 45/00
                                                        709/224
8,116,311 B1  2/2012 Kunz et al.
(Continued)

FOREIGN PATENT DOCUMENTS

GB        2377596 A    1/2003

OTHER PUBLICATIONS

PCT International Search Report and Written Opinion for International Application No. PCT/GB2019/051289, entitled "A System and Method for Distributing Packets in a Network," dated Jul. 2, 2019.

*Primary Examiner* — Yaotang Wang
(74) *Attorney, Agent, or Firm* — Hamilton, Brook, Smith & Reynolds, P.C.

(57) ABSTRACT

A system and method for distributing packets in a network are disclosed. The method comprises a step of receiving at least one data packet at a first node front a second node. The method also comprises a step of determining a current set of weights which are applied by the second node to distribute data packets across the first plurality of links. The received data packets are analysed to determine if the current set of weights are to be adjusted (step S102). When it is determined that the current set of weights is to be adjusted, an adjusted set of weights is generated by determining an adjustment factor (step S104). The adjustment factor is applied to the current weight for the selected link and at least one other current w eight in the current set of w eights.

25 Claims, 15 Drawing Sheets

(51) Int. Cl.
    *H04L 45/24*      (2022.01)
    *H04L 47/125*     (2022.01)
    *H04L 47/41*      (2022.01)
    *H04L 47/56*      (2022.01)

(52) U.S. Cl.
    CPC ............ *H04L 47/125* (2013.01); *H04L 47/41*
                    (2013.01); *H04L 47/562* (2013.01)

(56)  References Cited

U.S. PATENT DOCUMENTS

| | | | |
|---|---|---|---|
| 8,189,479 B1 * | 5/2012 | Doherty | ............ H04W 28/0236 |
| | | | 370/235 |
| 9,762,495 B1 | 9/2017 | Chen et al. | |
| 2002/0161925 A1 | 10/2002 | Munger et al. | |
| 2011/0116443 A1 | 5/2011 | Yu et al. | |
| 2016/0261507 A1 | 9/2016 | Kwak et al. | |
| 2017/0149877 A1 * | 5/2017 | Kabbani | ............. H04L 45/7453 |
| 2017/0170981 A1 | 6/2017 | Sung et al. | |
| 2017/0222930 A1 * | 8/2017 | Dhanabalan | ............ H04L 69/14 |
| 2017/0295100 A1 * | 10/2017 | Hira | ...................... H04L 45/125 |

* cited by examiner

SYSTEM AND METHOD FOR DISTRIBUTING PACKETS IN A NETWORK

This application is the U.S. National Stage of International Application No. PCT/GB2019/051289, filed May 10, 2019, which designates the U.S., published in English, and claims priority under 35 U.S.C. § 119 or 365(c) to Great Britain Application No. 1807694.3, filed May 11, 2018. The entire teachings of the above applications are incorporated herein by reference.

TECHNICAL FIELD

The invention relates to a system and method of distributing data packets through a network, in particular through a network having a plurality of links which can be aggregated, for example in a radio network.

BACKGROUND

In the context of computer networks, link aggregation is the practice of combining multiple links and presenting them as a single link to the outside world. It allows for improvements in capacity and reliability versus what is achievable when a single non-aggregated link is used.

FIG. 1 illustrates a network in which link aggregation is used. There is a distributor 10 which is connected to a collector 12 by a plurality of links: link 0, link 1, ... , link n. The distributor 10 receives data packets and splits them amongst the various links, according to some balancing mechanism. The collector 12 receives the packets from the various links, optionally re-orders the packets, and delivers them to the next part of the network, e.g. upper layers of the network stack.

A clear quantification of the capacity and reliability improvements associated with link aggregation would depend on the mechanism employed and how it is configured. In simple terms, and as intuition would suggest, the capacity of an aggregated link might be as high as the sum of the capacity of each of the individual links. Reliability is also increased by virtue of the fact that we are no longer in a situation where a single link failure is enough to bring communications to a halt. An aggregated link composed of N simple links could potentially survive N 1 simultaneous failures before communications are halted, albeit with a capacity penalty.

One challenge is to determine how packets are to be distributed amongst the various links. Some instances of this problem have known solutions. For example, when the capacity of each link is known, the distributor 10 can simply split traffic such that each link gets an amount of traffic that is proportional to its share of the overall capacity. For example, given N links with capacities $C=\{c_1, c_2, c_3 \ldots c_N\}$, the distributor 10 can simply split traffic such that each link gets an amount of traffic that is proportional to its share of the overall capacity, i.e. link i would get $$\frac{c_i}{\sum_{j=1}^{N} c_j}$$

or me overall traffic.

In another variation with a known solution, each link has a queue whose occupancy is known. The distributor 10 can then simply forward a given packet through the link whose queue occupancy is lowest.

As an example of another solution, US2011/0116443A1 describes an example of a radio network having a set of sending radio devices and a set of receiving devices. There is a load balancing radio device that receives data packets from an originating network and that labels the data packets with sequence numbers. The labelled data packets are then distributed among the sending data packets based on the relative capacities and statuses of the sending radio device. US2017/0170981 describes a method for increasing wireless communication throughput by adjusting a tunnel bandwidth weighting schema in response to a change in bandwidth capabilities. US2016/0261507 describes a method for controlling and managing a flow which classifies a flow management space into a plurality of spaces and adjusts variably the flow management space due to a control traffic processing overhead. U.S. Pat. No. 9,762,495 describes a method for adjusting network traffic balance among a plurality of communication links by determining weights for each link and associating a lower weight with a degraded link. US2002/0161925 describes an agile network protocol for secure communications with a load balancer. Typically in the prior art documents, the capacity and/or latency of each link is obtainable, e.g. in US2017/0170981 heartbeat packets are generated to monitor tunnel performance.

The applicant has recognised the need for a method and system which can distribute packets when there is little or no information regarding each link, including its capacity, status and/or latency.

SUMMARY

According to the present invention there is provided an apparatus and method as set forth in the appended claims. Other features of the invention will be apparent from the dependent claims, and the description which follows.

We thus describe a method of distributing data packets through a network comprising a plurality of nodes and a plurality of links connecting each pair of nodes, the method comprising: receiving at least one data packet at a first node from a second node, wherein the first node is connected to the second node via a first plurality of links, determining a current set of weights which are applied by the second node to distribute data packets across the first plurality of links, wherein the current set of weights comprises a current weight for each link in the first plurality of links; analysing the at least one data packet which is received at the first node from the second node to determine if the current set of weights are to be adjusted; and when it is determined that the current set of weights is to be adjusted, generating an adjusted set of weights by determining an adjustment factor to be applied to the current weight for a selected link in the first plurality of links; and applying the adjustment factor to the current weight for the selected link and at least one other current weight in the current set of weights.

The plurality of links may be termed an aggregated link and may be bi-directional, e.g. once the adjusted weights have been determined; the method may further comprise sending the adjusted weights to the second node. These adjusted weights may then be used as described below to send subsequent data packet(s) from the second node to the first node. The at least one data packet may be received and analysed at a collector at the first node and may be sent from a distributor at the first node. The adjusted set of weights may be considered to be feedback because it specifies how subsequent traffic is to be distributed across the links. In this way, the bi-directional nature of the aggregated link may be used to carry feedback from the first node to the second node (and vice-versa for the other direction).

Applying the adjustment factor may comprise one of: adding the adjustment factor to the current weight for the selected link to increase the amount of traffic which is distributed across the selected link or subtracting the adjustment factor from the current weight for the selected link to decrease the amount of traffic which is distributed across the selected link. In other words, a positive adjustment factor may be applied to increase the amount of traffic and a negative adjustment factor may be applied to decrease the amount of traffic on a particular link.

For example, where there are N links, the current set of weights may be defined as $W_A$, with a weight $w_1$ for each of the N links:

$$W_A = \{w_1, w_2, w_3, \ldots w_N\}$$

and the adjusted set of weights may be defined as:

$$\widehat{W_A} = \{\hat{w}_1, \hat{w}_2, \hat{w}_3, \ldots \hat{w}_N\}$$

The adjustment factor may be applied to a plurality of weights in the current set of weights so that the adjusted weight is adjusted in proportion to its current value. By adjusting the weights in proportion to their original values, it may be possible to converge on a solution more quickly. For example, when the adjustment factor is added to the current weight for the selected link, the adjustment factor may be applied to the plurality of weights to transfer more traffic from links having higher weights and vice versa when the adjustment factor is subtracted from the current weight for the selected link, the adjustment factor may be applied to the plurality of weights to transfer more traffic to links having higher weights. This may be expressed as:

$$\hat{w}_j(a) = \begin{cases} w_j + a, & i = j \\ w_j - a \cdot \dfrac{w_j}{C - w_i}, & i \neq j \end{cases}$$

where $\hat{w}_k$ (a) is the adjusted weight for each link k, a is the adjustment factor, $w_k$ is the current weight for each link k, and C is a constant value which represents the total of all weights, i.e.:

$$\sum_{i=0}^{N} w_i = C$$

The ratio by which the adjustment factor is multiplied, i.e. the wj/(C-wi) ratio, may be calculated as the relative weight $w_j$ of one other link j in comparison to all the weights-except-the weight $w_i$ for the selected link i. Using such a ratio is one way of changing the weights in proportion to their existing value whereby more traffic is transferred from links having higher weights to the selected link and vice versa.

Alternatively, the adjustment factor may be applied to only one other weight in the current set of weights. The remaining weights in the adjusted set of weights may have the same value as the current set of weights. In this way, traffic may be transferred between the selected link and its paired link. To balance the traffic load, when the adjustment factor is added to the current weight for the selected link, the adjustment factor is subtracted from the one other weight thus transferring the weight from paired link to the selected link and when the adjustment factor is subtracted from the current weight for the selected link, the adjustment factor is added to the one other weight thus transferring the weight to the paired link from the selected link. This may be expressed as:

$$\hat{w}_k(a) = \begin{cases} w_k + a, & i = k \\ w_k - a, & j = k \\ w_k, & i \neq k \text{ or } j \neq k \end{cases}$$

where $\hat{w}_k$ (a) is the set of adjusted weights, a is the adjustment factor and $w_k$ is the current weight for each link k.

Determining the current set of weights may comprise reading the current set of weights from a header attached to the at least one data packet, e.g. by piggy-backing on the data packet. In this way, there is no need to create new packets such as heartbeat packets to obtain information about the latency of a link or to monitor for packet loss as in the prior art, for example US2017/0170981. Where information on the link is not available, e.g. because it is not possible to generate heartbeat packets, the problem domain may be considered to be different from such prior art documents where link information can be obtained or is available. The header may comprise additional information, including some or all of a set of per-link sequence numbers, a global sequence number, a previous link field and a timestamp. The set of per-link sequence numbers may comprise a sequence number $s_i$ for each link i which is incremented each time a data packet is sent on link i. The global sequence number may be a number which incremented each time a data packet is sent on any one of the plurality of links. The previous link field may identify which link sent the previous packet. The timestamp may be the time at the second node when each data packet is sent out. The header may be updated by the second node before sending each data packet.

Analysing the at least one data packet may comprise analysing one or more logic blocks which may reside at the collector and which may include packet-loss steering logic and loss-less steering logic. The lossless steering logic may be applied before the packet-loss steering logic whereby balancing the distribution of packets, using lossless steering logic, over the plurality of links may be achieved. Lossless steering logic may be used to infer congestion from queue build-up, i.e. when a link is oversubscribed, the packet-queue on the transmitter side starts to grow. These longer queues lead to an increase in latency and this may be detected by the lossless steering logic to updates the weights before any packet-loss occurs.

Analysing the at least one data packet may thus comprise using packet-loss steering logic and determining that the current set of weights is to be adjusted when there has been packet loss. Such logic may use packet-loss events to infer congestion on a given link and thus traffic may be steered away from such a link. That is to say, if a given packet, or group of packets, is lost on a given link, it can be inferred that there is a high degree of probability that the link in question is oversubscribed, i.e. the queue is full. As such the packet-loss steering logic will direct traffic away from a link on which packet-loss has been detected.

Analysis using packet-loss steering logic may be done by comparing a per-link sequence number for each of two data packets received on the same link. For example, analysing the at least one data packet may comprise: determining which link the at least one data packet was received on, obtaining a first per-link sequence number for the determined link; storing the determined per-link sequence number; determining when a second data packet is received on the same link as the determined link; obtaining a second per-link sequence number for the second data packet; and determining whether or not there is packet loss by comparing the first and second per-link sequence numbers. Comparing may comprise determining the difference between the first and second per-link sequence numbers and when the difference is less than a packet-loss threshold, e.g. one, it is determined that there is no packet loss. When the difference is greater than the packet-loss threshold, it may be determined that there has been packet-loss. Each of the per-link sequence numbers may be read from the header as described above. Thus in other words, packet-loss detection uses a per-link sequence number field that the distributor adds to each packet. When there is packet loss, a negative adjustment factor may be applied in the equation above, for example:

$$a = -P_{pl}w_i$$

$$P_{ok} \in ]0,1]$$

where $P_{pl}$ may be termed a packet-loss penalty factor. The determining and obtaining steps may then be repeated for subsequently received data packets.

Analysing the at least one data packet may comprise analysing using lossless steering logic and determining that the current set of weights is to be adjusted when the latency of a link within the plurality of links is increasing. In other words, the loss-less steering logic may track a proxy for latency for each link and if latency increases it can be inferred that the number of packets in the queue is progressively increasing, a symptom of oversubscription. Lossless steering logic may be timestamp based or global sequence based.

Such timestamp based lossless steering logic analysis may be done by using a remote and a local timestamp for each of two data packets received on the same link to calculate a latency difference value wherein the remote timestamp represents the time at which each data packet was sent, the local timestamp represents the time at which each data packet was received and the latency difference value is representative of the latency on the link. For example, analysing the at least one data packet may comprise: determining which link a first data packet was received on, obtaining a first timestamp for the first data packet, the first timestamp indicating the time at which the data packet was sent from the second node; obtaining a second timestamp for the first data packet which indicates the time at which the first data packet was received at the first node; determining when a second data packet is received on the same link as the first data packet; obtaining a third timestamp for the second data packet, the third timestamp indicating the time at which the second data packet was sent from the second node; obtaining a fourth timestamp for the second data packet which indicates the time at which the second data packet was received at the first node; and calculating, using the first, second, third and fourth time stamps, a latency difference value which is representative of the latency on the link on which the first and second data packet was received.

Determining that the current set of weights are to be adjusted, may include comparing the latency difference value to a latency growth threshold. When the latency difference value is greater than latency growth threshold, it may be determined that the weights are to be adjusted. Each of the first and third timestamps may be read from the header as described above. The second and fourth timestamps may be obtained from a clock in the first node. When there is latency, a negative adjustment factor may be applied in the equation above, for example:

$$a = -P_{lg}W_i$$

$$P_{lg} \in ]0,1]$$

where $P_{lg}$ may be termed a latency growth penalty factor.

The timestamps may be used to detect one-way latency increases. The latency difference value is representative of the latency but is not equal to the real latency. The latency difference value may be the latency growth, i.e. the derivative of the latency. This is advantageous because it may be calculated using unidirectional traffic and without any sort of synchronization mechanism. For example, calculating the latency difference value may comprise: calculating a first latency value by subtracting the first timestamp from the second timestamp; calculating a second latency value by subtracting the third timestamp from the fourth timestamp; and calculating the latency difference value by subtracting the first latency value from the second latency value, i.e. by calculating:

$$\lambda_{i+1} - \lambda_i.$$

where $\lambda_{i+1}$ is the second latency value and is the first latency value, and $$\lambda_{i+1} = \alpha_{i+1} - \beta_{i+1}$$

$$\lambda_i = \alpha_i - \beta_i$$

where $\alpha_{i+1}$ is the fourth timestamp, $\beta_{i+1}$ is the third timestamp, a, is the second timestamp, and $\beta_i$ is the first timestamp.

Whether or not the weights are adjusted, the determining, calculating and obtaining steps may then be repeated for subsequently received data packets.

The method may further comprise storing a set of latency values comprising the most recently calculated latency value for each link. Similarly, the method may further comprise storing a set of latency difference values comprising the most recently calculated latency difference value for each link.

The timestamps may be optional and thus as an alternative, the lossless steering logic may also use a global sequence number to determine whether there is any latency. Such global sequence numbers instead may be added to each packet before sending, e.g. by a distributor. Analysing using such global sequence lossless steering logic may comprise calculating a discrepancy growth value between a first pair of data packets received within a threshold time on a pair of links and a second pair of data packets received on the same pair of links within the threshold time. Calculating the discrepancy growth value may comprise calculating a first global sequence discrepancy value for the first pair of data packets; calculating a second global sequence discrepancy value for the second pair of data packets;

and calculating the discrepancy growth value by subtracting the first global sequence discrepancy value from the second global sequence discrepancy value. For example, the threshold time may be set so that the pair of packets are received in quick succession on links i and j.

The analysis, e.g. by the collector, may comprise looking at the global sequence number of the packet received on each link and noting the difference between the two numbers. If this difference increases over time, it can be inferred that one of the links is probably oversubscribed, more specifically the link having the lower global sequence number is probably oversubscribed and thus traffic is steered away. For example, analysing the at least one data packet may comprise: obtaining a first global sequence number for a first data packet in the first pair of data packets; obtaining a second global sequence number for a second data packet in the first pair of data packets; obtaining a third global sequence number for a first data packet in the second pair of data packets; obtaining a fourth global sequence number for a second data packet in the second pair of data packets; calculating, using the first, second, third and fourth global sequence numbers, a discrepancy growth value which is representative of the latency on the links on which the first and second pairs of data packet were received.

For example, the first global sequence discrepancy value may be calculated by subtracting the first global sequence number from the second global sequence number; and the second global sequence discrepancy value may be calculated by subtracting the third global sequence number from the fourth global sequence number; and the discrepancy growth value may be calculated by subtracting first global sequence discrepancy value from the second global sequence discrepancy value, for example. by calculating:

$$\Delta^2 g = \Delta_{g1} - \Delta_{g0}$$

where $\Delta^2 g$ is the discrepancy growth value, $\Delta g_0$ is the first global sequence discrepancy value and $\Delta g_1$ is the first global sequence discrepancy value and $$\Delta g_0 = g_{0j} - g_{0i}$$

$$\Delta g_1 = g_{1j} - g_{1i}$$

Where $g_{0i}$ is the first global sequence number, $g_{0j}$ is the second global sequence number, $g_{1i}$ is the third global sequence number and $g_{1j}$ is the fourth global sequence number.

In this example, obtaining the first and second global sequence numbers may be in response to determining that the first pair of packets has been received within the threshold time by determining that a difference between times of receipt for both the data packets in the first pair of packets is lower than the threshold time. Similarly, obtaining the third and fourth global sequence numbers may be in response to determining that the second pair of packets has been received within the threshold time by determining that a difference between times of receipt for both the data packets in the second pair of packets is lower than the threshold time. The global sequence numbers may be read from the header on the received data packet.

In another example, the first global sequence discrepancy value may be calculated by subtracting the time of receipt of the second data packet in the first pair of packets from the time of receipt of the first data packet in the first pair of packets; and the second global sequence discrepancy value may be calculated by subtracting the time of receipt of the second data packet in the second pair of packets from the time of receipt of the first data packet in the second pair of packets. The discrepancy growth value may then be calculated by subtracting the first global sequence discrepancy value from the second global sequence discrepancy value, for example. by calculating:

$$\Delta^2 g = \Delta g_1 - \Delta g_0$$

where $\Delta^2 g$ is the discrepancy growth value, $\Delta g_0$ is the first global sequence discrepancy value and $\Delta g_1$ is the first global sequence discrepancy value and $$\lambda g_0 = \alpha_0 - \beta_0$$

$$\Delta g_1 = \alpha_1 - \beta_1$$

Where $\alpha_0$ is the time of receipt of the first data packet in the first pair of packets, $\beta_0$ is the time of receipt of the second data packet in the first pair of packets, $\alpha_1$ is the time of receipt of the first data packet in the second pair of packets and $\beta_0$ is the time of receipt of the second data packet in the second pair of packets.

Obtaining the first and second global sequence numbers may be in response to determining that the second data packet in the first pair of packets was received with a flag indicating that the second data packet was sent within the threshold time of the first data packet in the first pair of packets. Similarly, obtaining the third and fourth global sequence numbers may be in response to determining that the second data packet in the second pair of packets has been received with a flag indicating that the second data packet was sent within the threshold time of the first data packet in the second pair of packets. When it is determined that the flag is present, the method may further comprise using the first, second, third and fourth global sequence numbers to identify the first and second pairs of data packets. For example, when the flag is present, the method may comprise obtaining the global sequence number of the second data packet and identifying the first data packet by, searching a store, e.g. a table, for a data packet having a global sequence number which is one less than the global sequence number of the second data packet. Similarly, the method may comprise obtaining the global sequence number of the fourth data packet and identifying the third data packet by, searching a store, e.g. a table, for a data packet having a global sequence number which is one less than the global sequence number of the fourth data packet. The method may also comprise determining that the third and fourth data packets were sent on the same pair of links as the first and second data packets and rejecting them if they are not. Thus, in this way, the discrepancy growth value may be calculated, using the first, second, third and fourth global sequence numbers.

In both examples, the times of receipt may be determined from a clock on the node which receives the packets. The threshold time may be small to indicate that the pair of packets were received in quick succession. The discrepancy growth value may thus be representative of the latency on the links on which the first and second pairs of data packets were received and may be calculated using the global sequence numbers of the data packets.

Whether or not the weights are adjusted, the calculating and obtaining steps may then be repeated for subsequently received pairs of data packets on pairs of links. The method may further comprise storing a set of global sequence discrepancy values comprising the most recently calculated global sequence discrepancy value for each pair of links. Similarly, the method may comprise storing a set of discrepancy growth values comprising the most recently calculated discrepancy growth value for each pair of links. One of both of the set of global sequence discrepancy values and the set of discrepancy growth values may be stored in a directed graph. The or each discrepancy growth value may be adjusted using a packet rate of the received data packets and the adjustment may take place before storing.

Determining whether the current set of weights are to be adjusted may comprise comparing the discrepancy growth value to a discrepancy threshold. When a magnitude of the discrepancy growth value is greater than a magnitude of the discrepancy threshold, the method may comprise applying a loss-less adjustment factor as the adjustment factor to change the weights of the pair of links. For example, if the value of the growth is above the discrepancy threshold, traffic may be steered away from the second link towards the first link in the pair of links. If the growth is below the negative version of discrepancy threshold, traffic may be steered away from the first link and towards the second link. If the growth is close to zero, no action may be taken. In this example, the full weight adjusting mechanism may not be used because only the weights associated with a pair of links i and j are changed. The adjusted set of weights may be defined as:

$$\hat{w}_k(a) = \begin{cases} w_k + a, & i = k \\ w_k - a, & j = k \\ w_k, & i \neq k \text{ or } j \neq k \end{cases}$$

To steer traffic away from link j and towards link i, a may be determined by multiplying an adjustment factor $P_{ia}$ (which may be termed a lossless-adjustment factor) against the original weighting for link i, i.e.:

$$a = P_{ia} w_i$$

$$P_{ia} \in ]0,1]$$

Analysing the at least one data packet may comprise: determining when a link is not functioning properly within the network; and when it is determined that a link is not functioning, generating an adjusted set of weights to adjust the weight of the non functioning link by the adjustment factor. Determining a link is not functioning may comprise: determining that the time which has elapsed between receipt of a pair of packets on the same link is higher than a threshold; in response to this determining, monitoring for receipt of a packet on the same link within a countdown; and when no packet is received within the countdown, determining that the link is not functioning properly. In the formula above, the adjustment factor may be a negative adjustment factor a which may be the minimum of the current weight or the average weight, namely:

$$a = -1 \cdot \min\left(\frac{C}{N}, w_i\right),$$

Alternatively, the method may comprise determining a link is not functioning by: determining that a weight within the set of weights is zero; in response to this determining, starting a countdown; and once the countdown reaches zero, increasing the weight of the zero weighted link in proportion to the lowest weight in the set of weights. In the formula above, the adjustment factor may be a negative adjustment factor a defined by:

$$a = \gamma \cdot \min(W),$$

where $\gamma$ is a constant.

Each of the analysis steps above may be carried out even though when the capacity of each link is unknown, time-varying and/or potentially asymmetrical. Similarly, the analysis steps may be applied when latency is unknown, time-varying and/or potentially asymmetrical. There may also be no knowledge of queue occupancy and/or up-down status. Such a set of constraints is common in packet-oriented networks and thus the methods described above are particularly useful.

We also describe a collector in a first node in a network comprising a plurality of nodes, wherein the collector is configured to carry out the steps of the method described above.

We also describe a distributor in a second node in a network comprising a plurality of nodes, the distributor comprising a processor which is configured to apply a current set of weights when sending at least one data packet to the collector; receive an adjusted set of weights from the collector; and apply the adjusted set of weights when sending subsequent data packets to the collector. The processor may be further configured to add a header to a data packet before sending the data packet, wherein the header comprises a plurality of header values including at least one of a global sequence number, a set of per-link sequence numbers, a previous link field and a timestamp. The processor may be further configured to reset each of the header values in a reset phase and subsequently update each of the header values when a data packet is sent.

The link aggregation mechanism described above may be applied regardless of the specific nature of the links. It may thus be applicable to the domain of link aggregation on packetized networks, e.g. aggregation over different wireless protocols (e.g. LTE and Wi-Fi; Wi-Fi_____33 and WiGig), aggregation of multiple channels of the same wireless protocol (e.g. multiple Wi-Fi_____33 connections), hybrid aggregation between wireless and wired (e.g. Wi-Fi+Wi-Gig+Ethernet), link aggregation of multiple wired protocols (e.g. DOCSIS+ADSL; multiple ADSL connections; multiple Ethernet connections), and aggregation at the transport layer level. The distributors and collectors described above may reside in a radio controller and/or a remote terminal.

According to another aspect of the invention, there is also provided a computer readable medium, i.e. any storage device that can store data which can be read by a computer system, for storing a computer program which when implemented on a computer system (including a distributor and/or a collector) causes the steps of the method above to be performed. Examples of a computer readable medium include a hard-drive, read only memory, random access memory, a compact disc, CD-ROM, a digital versatile disk, a magnetic tape, other non-transitory devices and other non-optical storage devices. The computer readable medium may also be distributed over a network coupled system so that the computer program code is stored and executed in a distributed fashion. The computer readable medium is preferably non-transitory.

Although a few preferred embodiments of the present invention have been shown and described, it will be appreciated by those skilled in the art that various changes and modifications might be made without departing from the scope of the invention, as defined in the appended claims.

BRIEF DESCRIPTION OF DRAWINGS

For a better understanding of the invention, and to show how embodiments of the same may be carried into effect, reference will now be made, by way of example only, to the accompanying diagrammatic drawings in which:

FIG. 2b is a flowchart illustrating the steps carried out in the network of FIG. 2a;

FIG. 3b is a flowchart illustrating the steps carried out by a distributor within the network of FIG. 2a;

FIG. 4a is a schematic model of a link within the network of FIG. 2a;

FIGS. 6c and 6d are graphs for storing information which may be used in the method of FIG. 6a;

FIG. 7b is a flowchart of the steps carried out by the collector in an alternative portion of the method shown in FIG. 6a;

FIG. 8b is an illustration of the timing of a pair of packets used in the method of FIG. 8a;

DETAILED DESCRIPTION OF DRAWINGS

Figure 1:
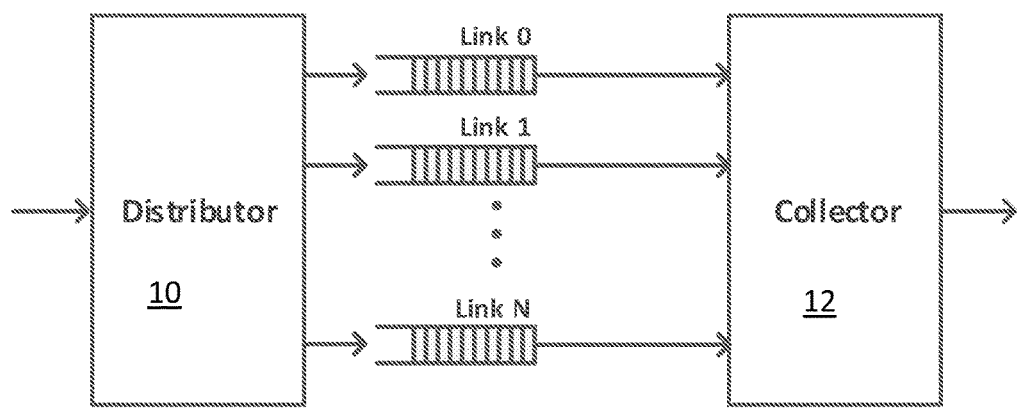
FIG. 1 is a schematic illustration of link aggregation within a network.
Figure 2A:
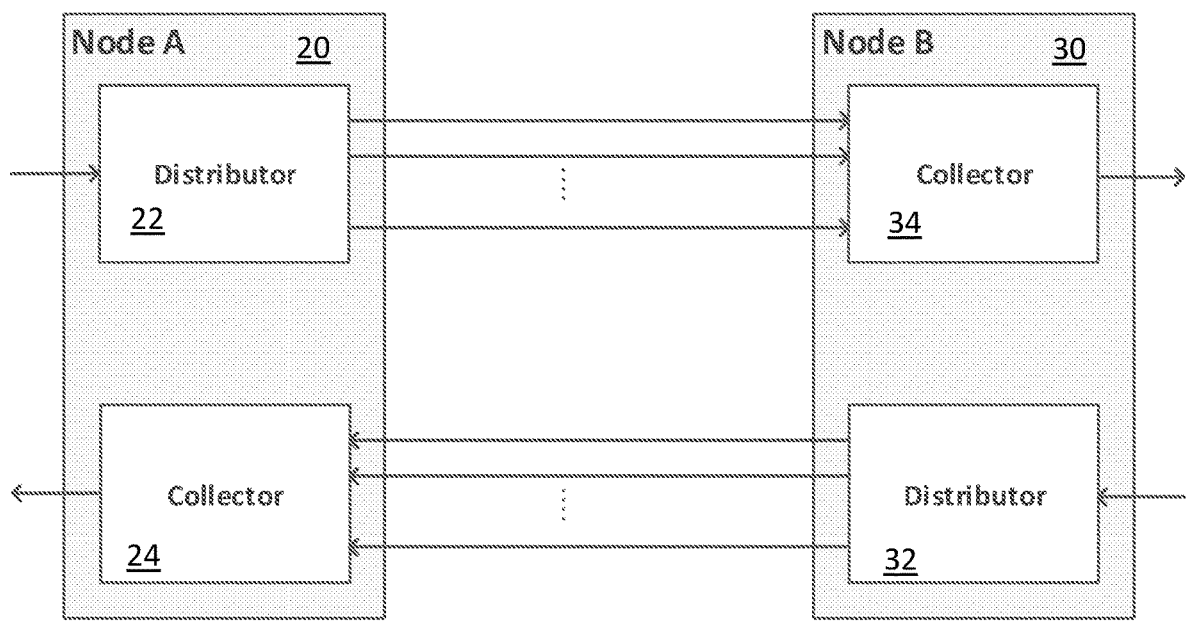
FIG. 2a is a schematic illustration of a network for link aggregation according to one embodiment.

FIG. 2a shows a computer network which incorporates link aggregation according to one embodiment. For simplicity, just a single pair of nodes 20, 30 is shown but it will be appreciated that the network may comprise many more such nodes. Each of these nodes may be located in different physical locations and may thus be termed as remote from one another. The first node 20 (labelled node A) comprises a first distributor 22 and a first collector 24. The second node 20 (labelled node B) comprises a second distributor 32 and a second collector 34. The first distributor 22 may be considered local to the first collector 24, i.e. they are located in the same location, but may be considered remote to the second collector 34. Similarly, the second distributor 32 may be considered local to the second collector 34, but may be considered remote from the first collector 24.

The nodes 20, 30 are connected via a bi-directional link to allow both nodes to send and receive packets. The bi-directional link comprises a first plurality of links from the distributor 22 in the first node 20 to the collector 34 in the second node 30 and a second plurality of links from the distributor 32 in the second node 30 to the collector 24 in the first node 30. The first and second plurality of links may have the same number of links. When a node is transmitting packets, it may be termed a transmitting end because it transmits packets to the other node which receives the packets and which may thus be termed a receiving end. The presence of bi-directional traffic is useful because it also allows feedback to be carried from the receiving end to the transmitting end, i.e. from the collector of node B to the distributor of node A, and likewise, from the collector of node A to the distributor of node B.

Figure 2B:
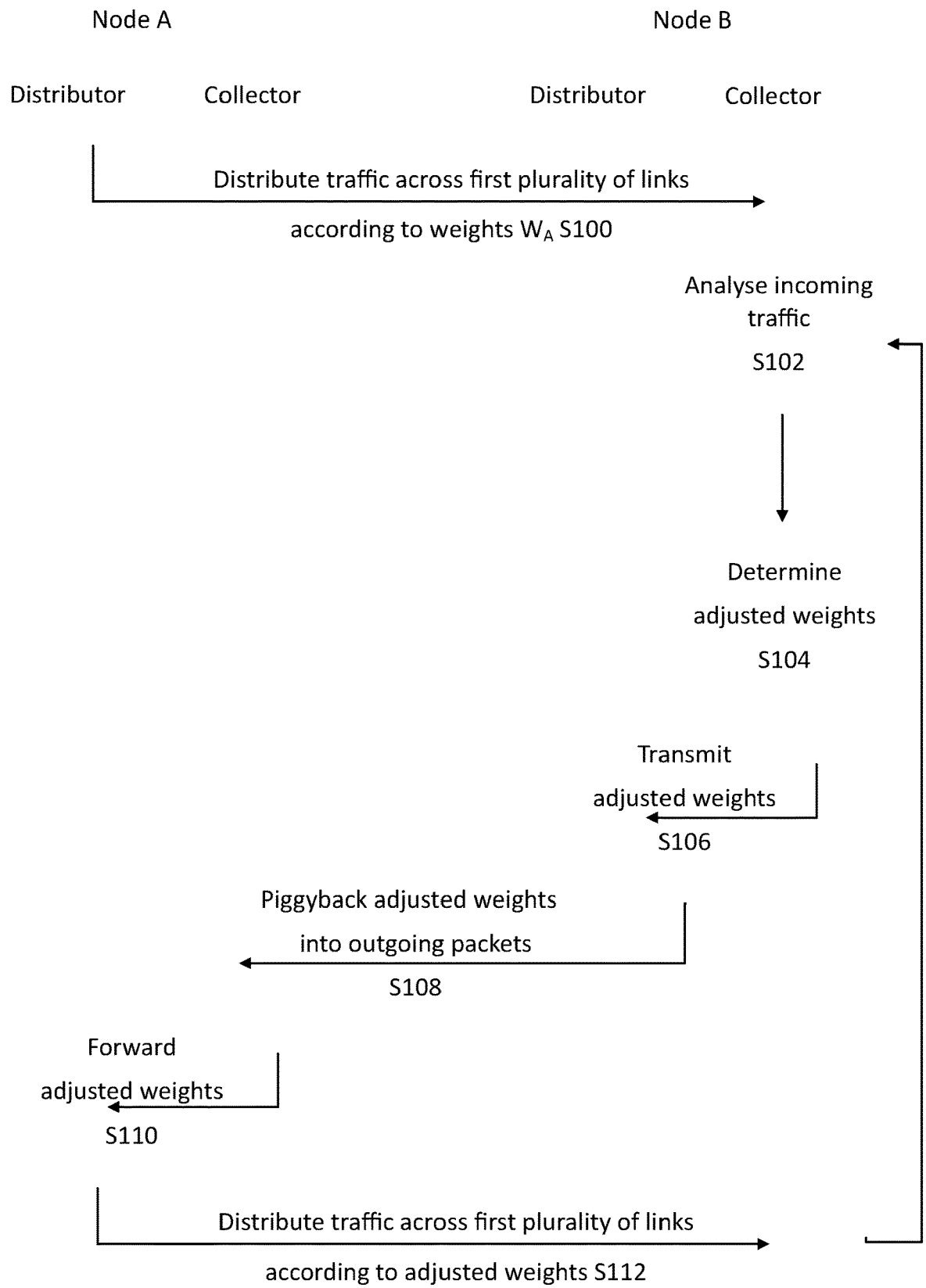

FIG. 2b is a flowchart of the communication between nodes A and B when node A is transmitting packets to node B. The first step S100 is for the distributor 22 of node A to send packets to the collector 34 of node B. The packets are distributed across the first plurality of links according to a set of weights $W_A$, with an entry IN, for each of the N links:

$$W_A = \{w_1, w_2, w_3, \ldots w_N\}$$

Similarly, there is also an independent set of weights $W_B$ for the second plurality of links with an entry $w_i$ for each of the M links where M may the equal to or different from N:

$$W_B = \{w_1, w_2, w_3, \ldots w_M\}$$

The weights specify how traffic should be split across the various links. The weights sum to a constant value $C_A$ or $C_B$, i.e.:

$$\sum_{i=0}^{N} w_i = C_A; \sum_{i=0}^{M} w_i = C_B$$

As an example, there may be four weights and $C_A$ and $C_B$ may equal 255. However, the constant values may be different for each node so that $C_A$ and $C_B$ are not equal. The constant value does not change over time and thus the set of weights $W_A$ will always sum to $C_A$. If the traffic on a given link i is defined by t, and the total traffic for node A is $T_A$; the distributor is configured to route packets to the various links, such that:

$$t_i = \frac{w_i}{C} T_A$$

The initial or default set of weights may evenly distribute traffic across each link. Thus:

$$\forall i, w_i = \frac{C}{N}$$

Once the incoming traffic is received by the collector 34 of node B it is analysed in step S102. The analysis includes at least one of packet-loss steering logic, lossless steering logic, and a dead-link detection mechanism which are described below in more detail. The analysis allows an adjusted set of weights $\hat{W}_A$ to be determined at step S104. The logic and mechanisms residing in the collector adjust weights by applying an adjustment factor a, to steer traffic away, or towards, a given link. For each link i, a positive adjustment factor implies transferring more weight to link i, conversely, a negative adjustment factor implies removing weight from link i, and re-distributing it amongst the other links. The adjusted set of weights may be defined as:

$$\widehat{W_A} = \{\hat{w}_1, \hat{w}_2, \ldots \hat{w}_N\} \text{ where}$$

$$\hat{w}_j(a) = \begin{cases} w_j + a, & i = j \\ w_j - a \cdot \frac{w_j}{C - w_i}, & i \neq j \end{cases}$$

In the equation above, there is an assumption that there is at least one non-dead link besides link i. If this is not the case, then the weight adjusting mechanism will take no action, because there are no links to transfer weight to.

Figure 2C:
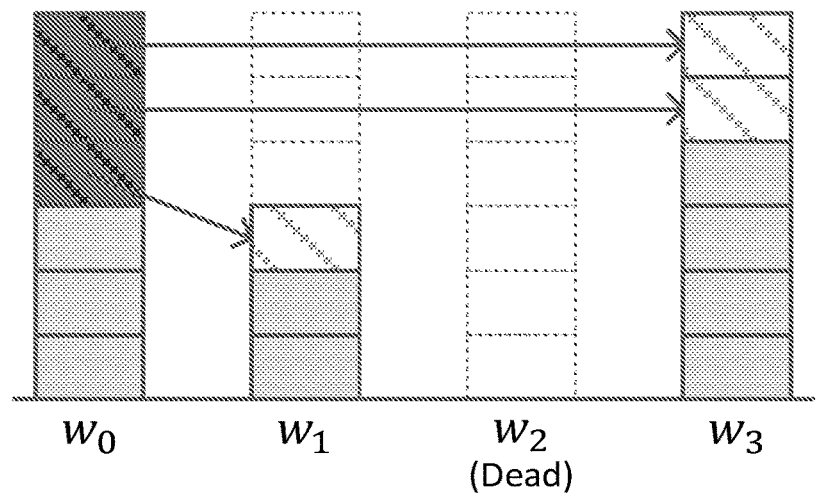
FIG. 2c is a schematic illustration of a weight adjustment mechanism as part of the method of FIG. 2b.

FIG. 2c illustrates an example of the implementation of the equation above. Intuitively, the equation above works as follows: it removes a certain amount of weight, a, from link i, and re-distributes this weight amongst the other links in proportion to their original weight. As shown in FIG. 2c, when re-distributing, the equation above will not transfer any weight to dead links, i.e. links with a weight of zero such as link 2, the method for resurrecting dead links is described later. In this example, three blocks of weight are illustrated as being transferred away from link 0, but the mechanism would work in a similar way if weight was being transferred to link 0, only the direction of the arrows would change.

As illustrated, the weight distribution mechanism, when transferring weight away from a given link i, or when putting more weight on given link i, satisfies the following property: each of the remaining links j, with j≠i, sees its relative weight change by factor that is, in absolute terms, increasing with $w_1$. In more informal terms, links with higher weights see a larger change vis-à-vis links with lower weights. In the example of FIG. 2c, link 3 has an existing weight which is twice as large as that for link 1. Accordingly, when adjusting the weights, link 3 receives twice as much of the weight being transferred away from link 0.

Adjusting the weights using this proportionality may result more quickly in convergence on a solution where the calculated weights are (proportionally) a good estimate for the capacity of each link and thus there is minimal or no packet loss and latency within the system. If equal amounts were transferred to each of links 1 and 3, it would be necessary to transfer smaller amounts to ensure that the capacity of the links is not exceeded and thus convergence is likely to take longer.

The equation above satisfies the property of changing the weights in proportion to the existing value for the weight but a skilled person will appreciate that there are many other ways to satisfy it. For example, at least to a first approximation, any link aggregation mechanism that distributes weights in such a way as to satisfy the property is contemplated, even if the property is not always satisfied, but satisfied with a high degree of probability.

Returning to FIG. 2b, the collector 34 will then forward the adjusted set of weights $\hat{W}_A$ to its local distributor 32 within the same local node (Step S106) so that the distributor 32 can send the adjusted set of weights $\hat{W}_A$ to the collector in the remote node A (step S108). The adjusted set of weights $\hat{W}_A$ could be piggy-backed into outgoing packets.

The collector 24 on node A receives the adjusted set of weights $\hat{W}_A$ and then forwards it to the distributor 22 of node A (step S110). Before forwarding the adjusted set of weights $\hat{W}_A$, the collector 24 may check whether or not the last transmission from the distributor 32 of the remote node B was received within a predetermined time range. If no transmissions have been received within the predetermined time range, the collector 24 may reset to the original set of weights $W_A$ e.g. where $$\forall i, w_i = \frac{C}{N}.$$

To determine whether the weights were received within the predetermined time range, the collector may keep a count-down timer D which may initially be inactive but once activated, it counts to zero, at which time the default set of weights is sent on.

When a packet arrives, if the timer is inactive—either because this is the first packet, or because it has fired before the collector will look into the feedback portion of the link aggregation header, extract the set of weights it has just received, $\hat{W}$, and forward them to the adjacent distributor. From the same packet, it will also extract the global sequence number, and store it locally as g. Finally, the collector will initiate the timer with the predetermined time range which may be termed weight-update-countdown and merely as an example 40 ms is a reasonable value for this countdown.

The collector may also check that weight updates are fresh (i.e. that the adjusted set of weights $\hat{W}_A$ really are the most up-to-date feedback information available); and not simply a set of weights that arrived through a link with a higher latency. This may be done when a packet arrives, and the timer is active. In this instance, the collector will compare the global sequence number stored as g, with the global sequence number it has just received. If the global sequence number it has just received is older than locally stored g, the collector will take no action regarding weight forwarding, as the new feedback is out-of-date. On the other hand, if the global sequence number just received is more recent than the global sequence number stored locally, then there is a fresh set of weights and as such the collector will forward the weights it has just received to the adjacent distributor, update the locally stored global sequence number g, and restart the countdown with a value of weight-update-countdown.

The collector 22 will then use the updated set of weights $\hat{W}_A$ when distributing subsequent packets (step S112) and steps S102 to S110 are then repeated to generate a subsequent updated set of weights.

It will be appreciated that the mirror-image method can be used to update the set of weights $W_B$ used by the distributor 32 of node B. The method can also be replicated across pairs of nodes in a network of multiple nodes.

Distributor

Figure 3A:
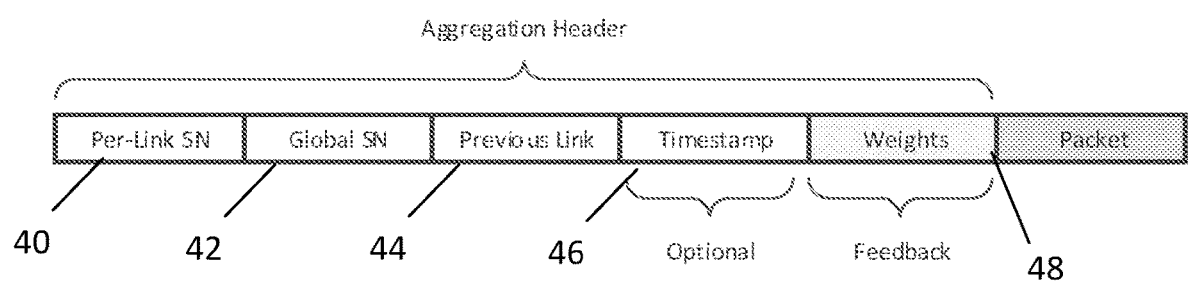
FIG. 3a is an example header to be included in a packet being carried through the network.

Before sending a packet, the distributor may be configured to piggy-back some extra data onto the packet. The exact place where this data is inserted will depend on the nature of the underlying layer. In one example illustrated in FIG. 3a, this data is simply prepended as an extra header. This header may include a per-link sequence number 40, a global sequence number 42, a previous link field 44, a timestamp 46 (where this is available as explained in more detail below), and the weights 48 that the other distributor should use (e.g. as described in relation to step S108). As an example, the field which includes the weights may use 1 byte per weight.

Each distributor has a set of per-link sequence numbers $S=\{s_1, s_2, s_3 \ldots s_N\}$, one for each link. The per-link sequence number $s_i$ for each link i is a sequence number that is incremented by one whenever a packet is sent through a link. The global sequence number is a sequence number that is incremented by one whenever a packet is sent on any link. Thus, the global sequence number tracks how many packets have been sent whereas the per-link sequence number tracks how many times each link has been used. As explained below, the per-link sequence number may be used by packet-loss steering logic at the collector end to detect packet loss events on a given link. The global sequence number may be used by the re-order mechanism and, in some embodiments, by the lossless steering logic as well.

The number of bits used for the per-link sequence number may be low, potentially just one bit but more typically three bits, whereas more bits, typically eighteen, are used for the global sequence number. Deciding on the number of bits is important because there is a trade-off between false negatives and header size. For example, for the per-link sequence number, if two bits are used and four packets are lost, the per-link sequence number will cycle the per-link sequence number and the packet-loss steering logic will not consider this to be a packet-loss event which thus results in a false positive. A reasonable trade-off is represented by three bits. For the global sequence number, deciding on the number of bits is not trivial and factors such as the maximum packet rate, the maximum delay and the time-window within which compared global sequence numbers are received need to be taken into account because it is important to ensure that the logic surrounding global sequence numbers correctly handles integer overflow.

The previous link field 44 identifies which link sent the previous packet and as explained below is used by the dead link detection mechanism. As an example, two bits of information may be used for this field. In some embodiments, the distributor will add a timestamp 46 to each of the packets that are sent. More specifically, the distributor will have a local clock, $C_{dist}$, and when a packet is sent, the present value of this clock will constitute the timestamp. This field is optional, but if there are enough resources to carry the timestamp it can improve the decision-making capabilities of the lossless steering logic. As an example, twenty bits of information may be used for this field and the values may be expressed in microseconds.

Figure 3B:
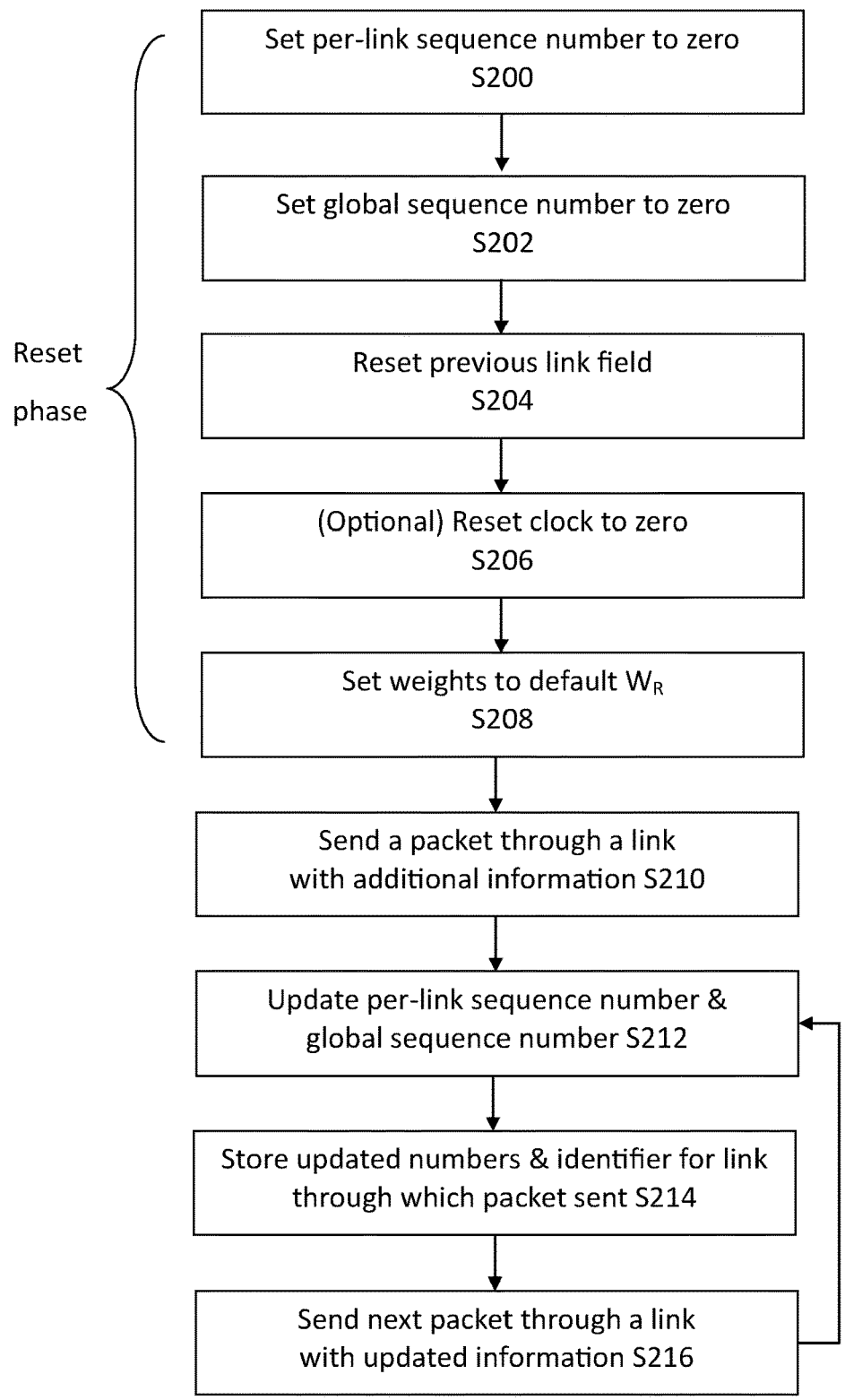

FIG. 3b shows the steps which may be carried out at the distributor to include this additional information. At the start of the process, e.g. at the start of the day, there is a reset phase in which some or all the additional information which is inserted by the distributor is reset to default values. The per-link sequence number for each sequence is set to a base value, e.g. zero (S200) and the global sequence number is set to a base value, e.g. zero (S202). The previous link field is set to a base value to indicate that no previous packet has been sent (S204). Where a timestamp is being used, the clock may be set to a base value, e.g. zero (S206). It is noted that the logic described below does not require frequency precision requirements and thus it is possible to dispense with synchronization mechanisms for the clock. The weights are also reset to the default values, e.g.

$$W_R = \{w_1, w_2, w_3 \ldots w_N\}, \text{ with } w_i = \frac{C}{N} \forall i$$

$W_R$ indicates that these are not the weights being used by this distributor but are being used by another, i.e. remote, distributor. For example, the distributor 34 of node B sends the weights for the distributor 24 of node A or vice versa. These default values persist until the local collector, i.e. collector 32 for the distributor 34, produces an updated set of weights as explained above. These default values are stored locally in the distributor. These reset steps are listed in a particular order but it will be appreciated that they can be carried out simultaneously or in a different order.

The next step is to send a packet through a link with the default values appended (S210). Thus, when a packet is sent through link i, the per-link sequence number $s_i=0$ will go with the packet. Similarly, the global sequence number of zero will also be sent. The previous link field will include a base value which indicates that no other messages have been sent. The present value of the clock may optionally be included as the timestamp. The default values of the weights for the remote distributor, i.e. the distributor which is local to the collector which receives the packet, are also included. The distributor also increments the per-link sequence number, i.e. $s_i=1$, and the global sequence number (S212). The updated per-link sequence number and the global sequence number are stored locally on the distributor together with a record tracking that the packet was sent over link i (S214).

The next packet is then sent by the distributor through the same or a different link (S216). The updated information is appended to the packet. As an example, if the packet is sent through link j, the per-link sequence number $s_j=0$ will go with the packet and if the packet is sent again through link i, the per-link sequence number $s_i=1$ will be sent. The updated global sequence number of one will also be sent. The previous link field will include a value which indicates that the previous packet was sent on link i. The new and present value of the clock may optionally be included as the timestamp. The weights for the remote distributor are also included and these will be the default weights unless they have already been updated as explained above.

As indicated by the arrow, the next step is to return to the updating of the per-link sequence number and the global sequence number (S212). For example, if the packet is sent through link j, the per-link sequence number is updated to $s_j=1$ and if the packet is sent again through link i, the per-link sequence number is updated to $s_i=2$. The updated global sequence number may be two. The updates are stored with the new identifier for the previous link field. It will thus be appreciated that the process is an iterative one and the sending, updating and storing steps are repeated as often as necessary.

If the time between the sending of two packets is more than a predetermined threshold termed a recent-thresh threshold, the identifier for the previous link field may be reset to the base value to indicate that no previous packet has been sent as described in S204. The value of the recent-thresh threshold may be configurable but as an example may also be set to 0.5 ms (e.g. as a default value).

Figure 4A:
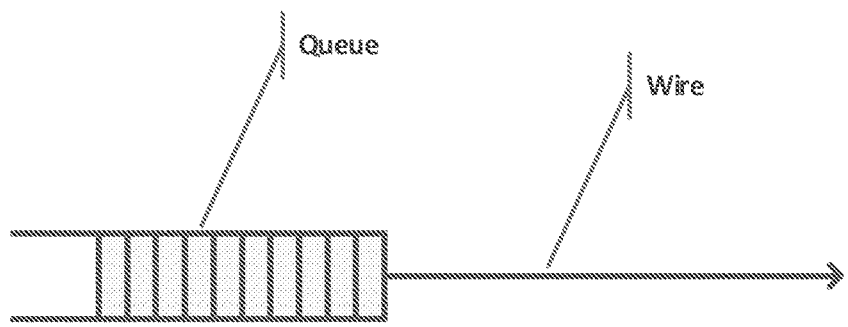

As set out above, the analysis at the collector to determine an adjusted set of weights $\hat{W}_A$ includes at least one of packet-loss steering logic and lossless steering logic. FIG. 4a illustrates a model which may be used for each link. As shown each link may be modelled as a queue followed by a "wire" that adds a quasi-fixed delay, which is to say, a delay that can be said to be constant for short enough periods of time. When a packet is sent across the link, it will first go into the queue. If the queue is full the packet will be dropped, otherwise if there is space in queue, the packet will be stored waiting its turn on the wire. The queue will empty at rate determined by the link capacity. Once a packet reaches the wire, it will take a quasi-fixed amount of time to reach the end.

The packet-loss steering logic uses packet-loss events to infer congestion on a given link. That is to say, if a given packet, or group of packets, is lost on a given link, it is inferred that there is a high degree of probability that the link in question is oversubscribed, i.e. the queue is full. In such a circumstance, the packet-loss steering logic aims to direct traffic away from a link on which packet-loss has been detected.

As explained in more detail below the lossless steering logic tracks a proxy for latency for each link. If latency increases, it is inferred that the number of packets in the queue is progressively increasing. This may be a symptom of oversubscription and thus the lossless steering logic aims to direct traffic away from a link on which a latency increase has been detected. Ideally the lossless steering logic will kick-in before packet-loss steering logic, and lossless balancing across the multiple links will be achieved.

Packet Loss Steering Logic

Figure 4B:
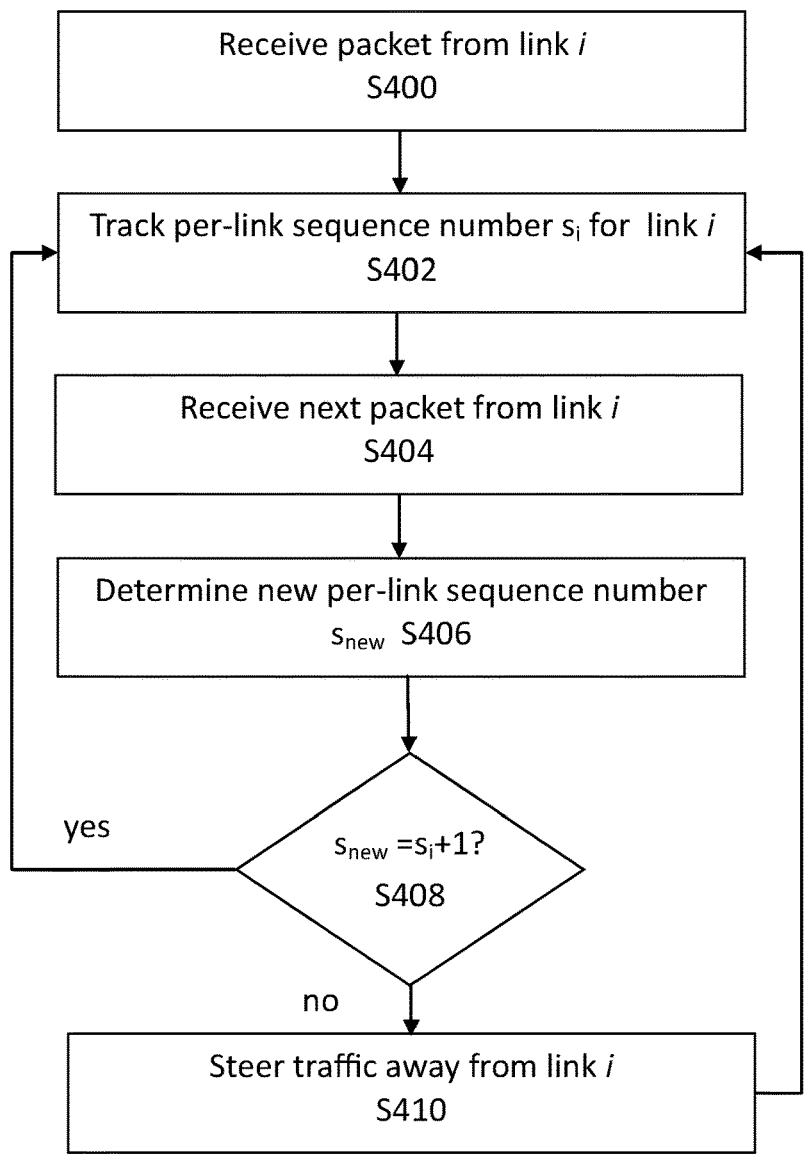
FIG. 4b is a flowchart of the steps carried out by the collector in one example of packet-loss steering logic

FIG. 4b illustrates the steps which may be carried out by the collector to implement the packet-loss steering logic. FIG. 4b illustrates the step in relation to a single link i but it will be appreciated that this is repeated for all links by the collector keeping track of the last per-link sequence number received on each link, $S=\{s_1, s_2, s_3 \ldots s_N\}$. Initially the collector receives a packet on link i (step S400). The collector determines and stores the per-link sequence number $s_i$ for link i (step S402). When a new packet arrives on link i (step S404), the collector determines the per-link sequence number of the new packet (step S406) and then determines whether the per-link sequence number of the packet which has just been received is equal to $s_i+1$ (step S408). If there is a match, then the packet-loss steering logic will take no action besides returning to step S402 to track (i.e. storing) the new value $s_{new}$ as the per-link sequence number $s_i$. The method can then be reiterated.

On the other hand, if they differ, at least one packet has been lost, and traffic may then be steered away from that link using the weight adjusting mechanism outlined above. Thus the adjusted set of weights may be defined using the equation above, namely:

$$\hat{w}_j(a) = \begin{cases} w_j + a, & i = j \\ w_j - a \cdot \dfrac{w_j}{C - w_i}, & i \neq j \end{cases}$$

where a is a negative adjustment and may be determined by multiplying an adjustment factor $P_{pl}$ (which may be termed a packet-loss-penalty factor) against the original weighting, i.e.:

$$a = -P_{pl} w_i$$

$$P_{pl} \in ]0,1]$$

For example, a suitable value is 0.05.

Once the weights have been adjusted, the method repeats the steps S402 to S408. A more complex embodiment of the invention may use a PID controller at this stage.

Timestamp Based Lossless Steering Logic

Figure 5A:
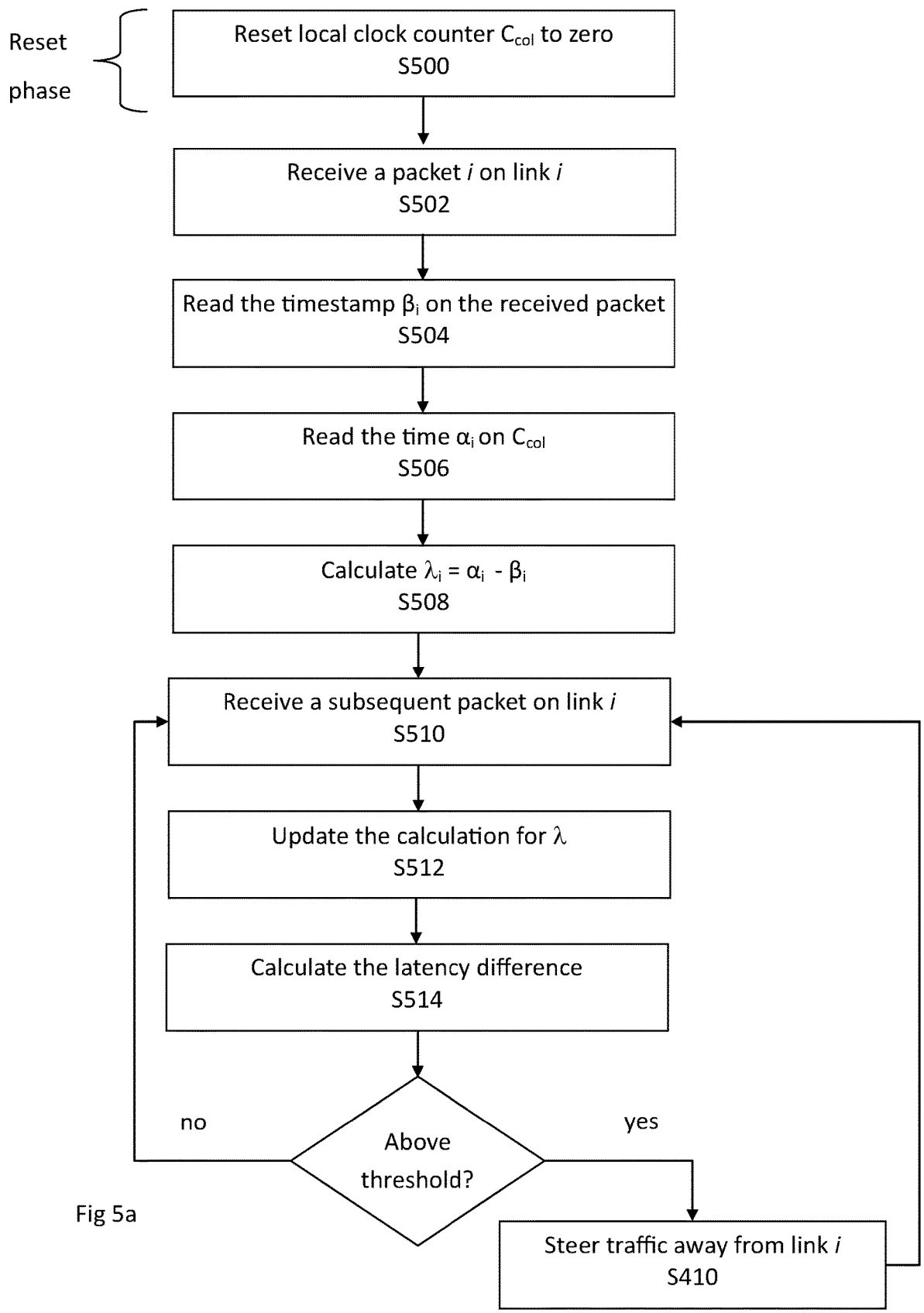
FIG. 5a is a flowchart of the steps carried out by the collector in one example of lossless steering logic.
Figure 5B:
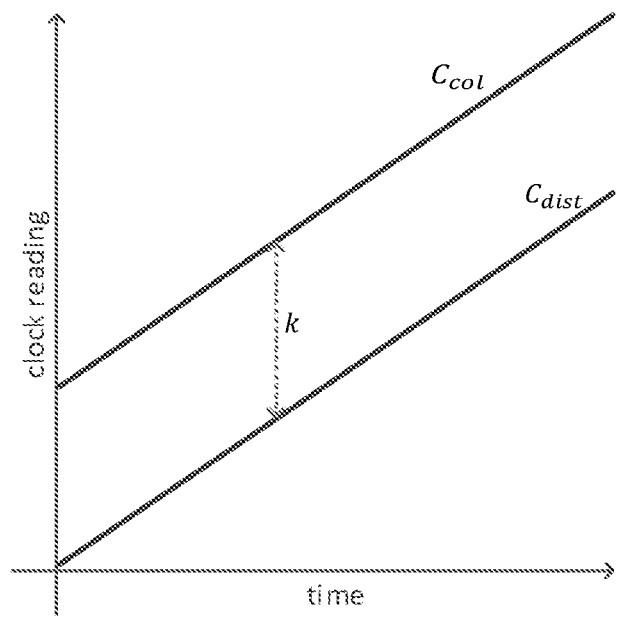
FIG. 5b is a graph of clock reading against time.
Figure 5C:
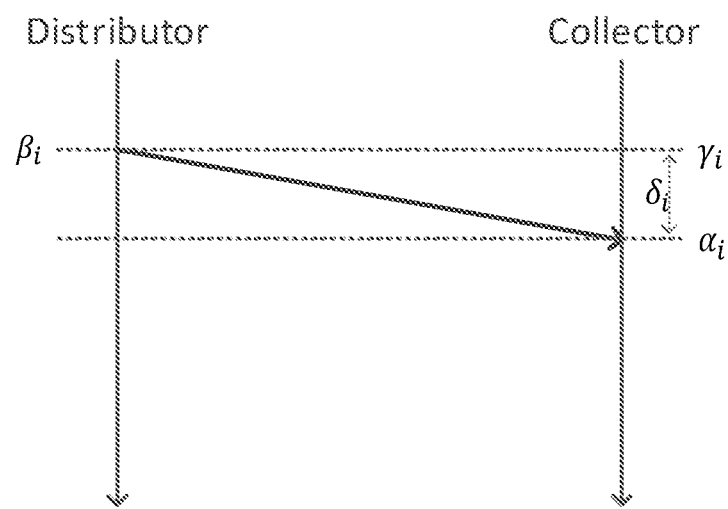
FIG. 5c is an illustration of time delay between the distributor and the collector.

FIGS. 5a to 5c illustrate a first method which may be carried out by the collector to implement the lossless steering logic. In this method, timestamps are present on the aggregation header. In an optional reset step illustrated in FIG. 5a, the local clock counter, $C_{col}$ (where the subscript "col" stands for "Collector") is reset to zero. As was the case with the distributor clock $C_{dist}$, there are no strong requirements pertaining to frequency or phase. This clock may start with a value with zero, and does not require any extra frequency synchronization mechanisms.

FIG. 5b illustrates the relationship between the clock readings over time for the far-end (remote) distributor clock, and local collector clock, $C_{dist}$ and $C_{col}$. These clocks might have started at different times, and each end does not know what the reading of the other at is given instant in time. However, if they are running at a similar frequency, or are off by a multiplicative factor that can be corrected for, then we have that, for the short-to-medium term, $C_{col}-C_{dist}=k$. Which is to say, at a given instant, the clock readings, will differ by a constant amount k. It is noted that systems with stringent synchronization requirements would not be able to make this assumption, and would have to employ some sort of synchronization mechanism.

Returning to FIG. 5a, the next step S502 is to receive a packet i at the collector from the remote distributor on link i. As explained above when a given packet i leaves the distributor, the distributor determines that the time on the clock at the distributor $C_{dist}$ reads $\beta_i$, and thus packet i's timestamp will be $\beta_i$. This value for the timestamp is read by the collector (step S504). When a packet is received, the collector reads the time on the collector clock, $C_{col}$, which has a reading of a, (step S506). It is noted that steps S502 to S506 are shown as sequential steps but it will be appreciated that they may be carried out together or in a different order.

As illustrated in FIG. 5c, the sending of the packet over link i adds an unknown delay $\delta_i$. It is also not known what the clock reading $\gamma_i$ would be on the collector clock for the time at which the packet was sent. Thus the clock reading a, on the collector clock at the time of receipt of the message may be expressed in terms of the two unknowns:

$$\alpha_i = \gamma_i + \delta_i.$$

However, it is known that $\gamma_i$ and $\beta_i$ pertain to the same moment in time and that, as shown in FIG. 5b, there is a constant difference of k between the two readings, i.e. that $\gamma_i - \beta_i = k$. Accordingly, combining these equations leads to:

$$\alpha_i - \beta_i = \gamma_i + \delta_i - \beta_i = k + \delta_i$$

Returning to FIG. 5a, the next step is to calculate $\alpha_i - \beta_i$ as $\lambda_i$, which is equal to the latency of packet i plus a constant. We are able to calculate $\lambda_i$, as both $\alpha_i$ and $\beta_i$ are known at this point (note that k and are still unknowns). As shown at step S510, subsequently, a second packet is received on the same link and the timestamp $\beta_{i+1}$ on the packet and the time $\alpha_{i+1}$ on the collector clock are read as at steps S504 and S506. The updated value for λ is then calculated:

$$\lambda_{i+1} = \alpha_{i+1} - \beta_{i+1}$$

The two values for λ can be expressed in terms of two unknowns k and $\delta_i$, i.e. $\lambda_{i+1} = k + \delta_{i+1}$ and $\lambda_i = k + \delta_i$. The difference between the two values for λ is thus equivalent to the difference between the two values for the unknown latency, i.e.

$$\lambda_{i+1} - \lambda_i = k + \delta_{i+1} - k - \delta_i = \delta_{i+1} - \delta_i$$

That is to say, from $\lambda_{i+1}$ and $\lambda_i$ we are able to determine the latency difference $\dot{\delta} = \delta_{i+1} - \delta_i$, i.e. the derivative of the latency (step S514). A growing latency on a given link suggests that the link's queue is filling up, a symptom of oversubscription.

The next step is to compare the latency difference with a threshold which may be termed a latency-growth-threshold. This threshold may be configurable but a suitable example value is 0.4 ms. If the value is below the threshold, then the logic will take no action besides returning to step S510 to reiterate the method when a subsequent packet is received.

On the other hand, if the current value is above the latency-growth-threshold, traffic may then be steered way from that link using the weight adjusting mechanism outlined above. Thus the adjusted set of weights may be defined as:

$$\hat{w}_j(a) = \begin{cases} w_j + a, & i = j \\ w_j - a \cdot \dfrac{w_j}{C - w_i}, & i \neq j \end{cases}$$

where a is a negative adjustment and may be determined by multiplying an adjustment factor $P_{lg}$ (which may be termed a latency-growth-penalty factor) against the original weighting, i.e.:

$$\alpha = -P_{lg} w_i$$

$$P_{lg} \in ]0,1]$$

For example, a suitable value is 0.01.

Once the weights have been adjusted, the method returns to step S510 to await a subsequent packet. A more complex embodiment of the invention may use a PID controller at this stage.

It will be appreciated that this method is just detailed for a single link but applies to all links. The collector may thus keep a set, $\Lambda = \{\pi_1, \lambda_2, \ldots \lambda_N\}$, with the last $\lambda$ calculated for each link i. Additionally, the collector may keep a second set $\dot{\Delta} = \{\delta_1, \delta_2, \ldots, \delta_N\}$ tracking an exponential moving average of the latency difference.

Global Sequence Based Lossless Steering Logic

FIGS. 6a to 6d illustrate a second method which may be carried out by the collector to implement the lossless steering logic. In this method, timestamps are not present on the aggregation header and the global sequence number is used as detailed below.

Figure 6A:
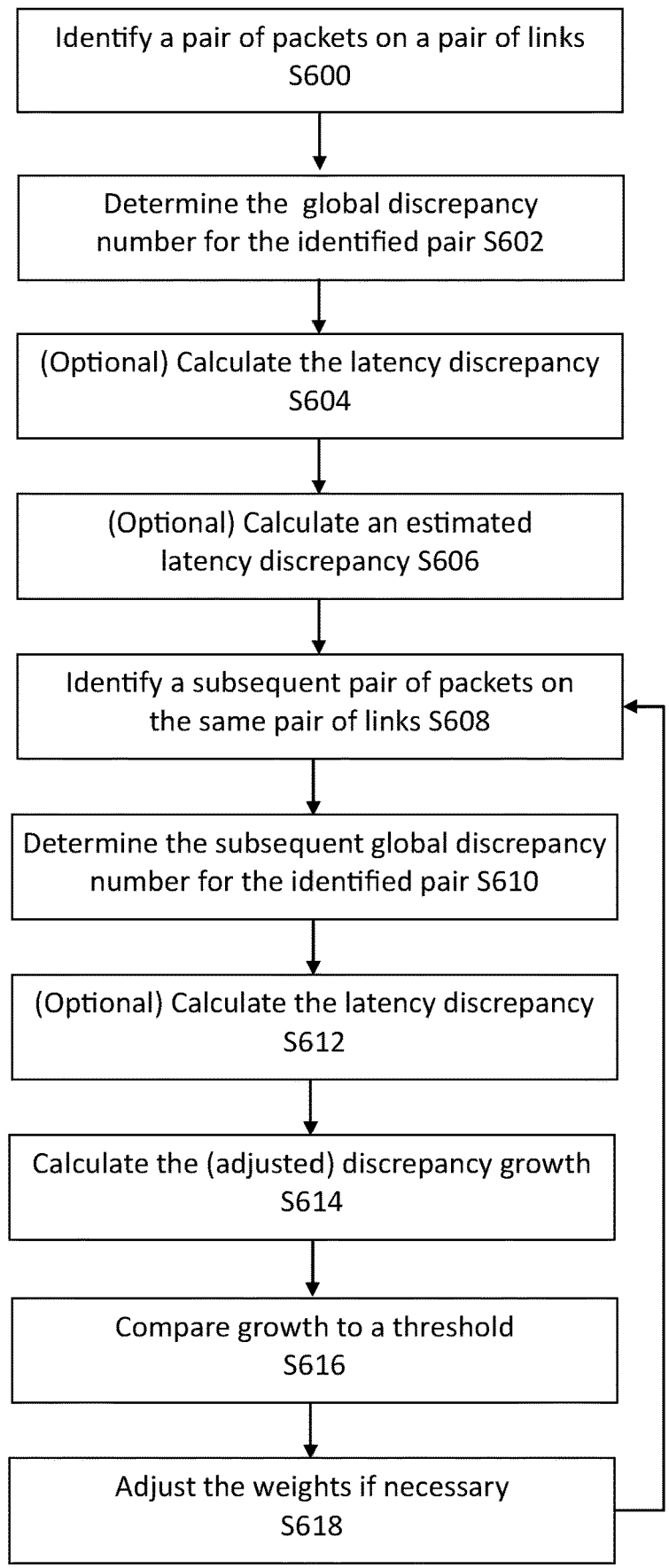
FIG. 6a is a flowchart of the steps carried out by the collector in a second example of lossless steering logic.
Figure 6B:
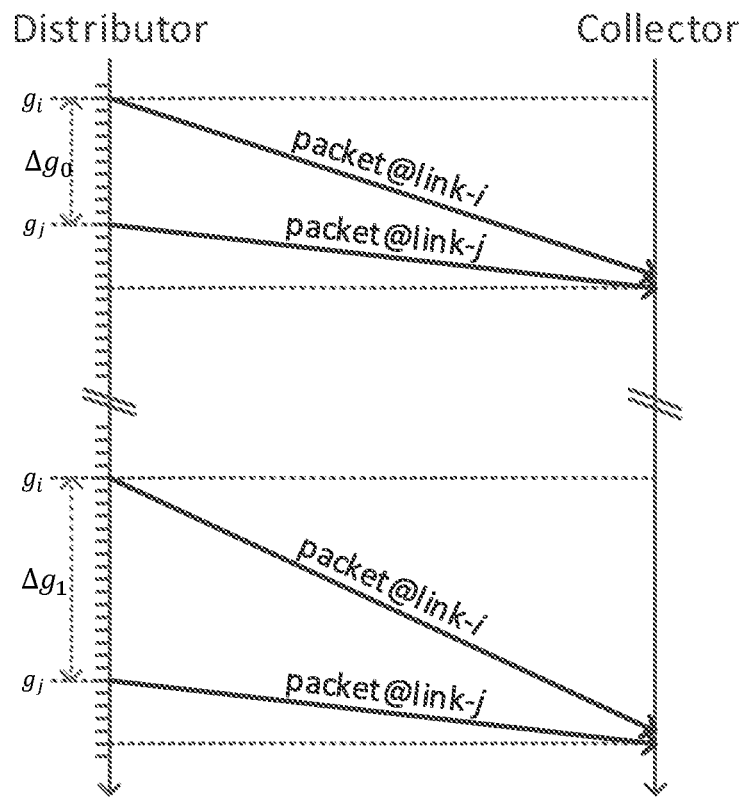
FIG. 6b is an illustration of two pairs of packets arriving in quick succession.

FIG. 6a shows that the first step S600 is to identify a pair of packets which have been received in quick succession on a pair of links, namely link i and link j. The exact nature of quick succession will depend on the application but as an example, the pair of packets should be received within a threshold value, e.g. 0.01 ms, of one another. It will be appreciated that this number is merely illustrative. An example of such a pair of packets is shown in FIG. 6b. The packet on link i arrives with a global sequence number of $g_i$ and the packet on link j arrives with a global sequence number of $g_j$. These numbers are read by the collector and the next step S602 is to determine the global sequence number discrepancy $\Delta g$ which is the difference between those two global sequence numbers, i.e.

$$\Delta g = g_j - g_i,$$

It is noted that if $\Delta g > 0$ the latency associated with link i is probably larger than the latency associated with link j (e.g. as would be the case if $g_i = 100$ and $g_j = 140$, since the packet with a global sequence number of 140 was sent after the packet with a global sequence number of 100, and yet both arrived almost at the same time). If $\Delta g < 0$, the reverse is true ($\Delta g = 0$ never occurs, as global sequence numbers are unique for short enough periods of time, that is to say, before integer overflow occurs).

The global sequence number discrepancy is proportional to the latency discrepancy. However, although the latency discrepancy is one of the factors that accounts for a given global sequence discrepancy, a second major factor influencing this value is packet rate, i.e. the number of packets-per-unit of time that is being sent. For example, consider two packets i and j, received in quick succession, with $g_i = 100$ and $g_j = 140$ at given aggregated packet rate $r_0$. Now suppose that latency remains the same but packet rate doubles, $r_1 = 2 r_0$. This this will cause global sequence numbers to increase at twice the rate and thus for the same latency discrepancy we would now have $g_i = 100$ and $g_j = 180$. Accordingly, an optional step is to calculate the adjusted global sequence number $\Delta \bar{g}$ which has been adjusted for packet rate $r(t)$, i.e.

$$\Delta \bar{g} = \frac{g_j - g_i}{r(t)}$$

It is noted that the nominator's unit is 'packets', whilst the unit of the denominator is 'packets-per-second'. Accordingly, the unit of $\Delta \bar{g}$ is seconds, which means that $\Delta \bar{g}$ is no longer a measure proportional to the latency difference (as was the case with $\Delta g$) but the latency difference itself (or at least an estimate of it), as such we will call $\Delta \bar{g}$ the latency discrepancy.

If the pair of packets is the first pair of packets which have been received on this particular pair of links, there is an optional step S606 of calculating an estimated latency discrepancy for this pair of links. One method of calculating such an estimated latency discrepancy relies on the assumption that the latency discrepancy between the various links is fixed and uses the knowledge of the latency discrepancy between other links. For example, if the latency discrepancy between links i and k is 0.5 miliseconds, and the latency discrepancy between links k and j is 1.3 miliseconds, it can be inferred that the estimated latency discrepancy between links i and j is 1.8 miliseconds. The estimated latency discrepancy can be used with the latency discrepancy calculated based on the global sequence numbers to determine the discrepancy growth as explained below in relation to step S614.

If the pair of packets are the first pair of packets which have been received on this particular pair of links, the method may also continue as shown at step S608 by identifying a second pair of packets, also in quick succession, on the same set of links i and j. Such a second pair of packets is shown in FIG. 6b. As before, the global sequence numbers of each packet are read by the collector and the next step S610 is to determine a subsequent global sequence number discrepancy $\Delta g_1$. This global sequence number discrepancy may be optionally adjusted at step S612 to give the latency discrepancy $\Delta \bar{g}_1$ as explained with reference to step S604.

The previous global sequence number discrepancy may be denoted as $\Delta g_0$ and the adjusted global sequence number discrepancy (i.e. latency discrepancy) as $\Delta \bar{g}_0$. As illustrated at step S614, the values from the two pairs can be used to measure the discrepancy growth $\Delta^2 g$ by calculating:

$$\Delta^2 g = \Delta g_1 - \Delta g_0$$

Similarly, the adjusted discrepancy growth (also termed the latency discrepancy growth) may be calculated from:

$$\Delta^2 \bar{g}_{1,0} = \Delta \bar{g}_1 - \Delta \bar{g}_0$$

The global sequence discrepancy $\Delta g$ may be considered to be an inclination between the two links, and the discrepancy growth, $\Delta^2 g$, to be the growth rate of this inclination. Assuming for now that packet rate is constant, a positive value of the discrepancy growth, i.e. $\Delta^2 g > 0$, arises in one of the following situations:

Latency over link i increased, but the latency over link j increased more.

Latency over link i is stable, whilst the latency over link j increased.

Latency over link i decreased, whilst the latency over link j increased.

Latency over link i decreased, whilst the latency over link j remained stable.

Latency over link i decreased, whilst the latency over link j decreased by a smaller amount.

In all the scenarios listed above a better set of weights steers some traffic away from link j and towards link i.

At step S616, the growth is compared to a threshold known as the discrepancy-threshold threshold. If the value of the growth is above the discrepancy-threshold threshold, traffic is steered away from link j towards link i (step S618). If the growth is below the negative version of discrepancy-threshold threshold, traffic is steered away from link i and towards j. If the growth is close to zero, i.e. between the range defined from -discrepancy-thresh to discrepancy-thresh, no action is taken. The discrepancy threshold can be configurable but an example value is a default 0.2 ms.

In this example, the full weight adjusting mechanism is not used because only the weights associated with links i and j are changed. The adjusted set of weights may be defined as:

$$\hat{w}_k(a) = \begin{cases} w_k + a, & i = k \\ w_k - a, & j = k \\ w_k, & \text{otherwise} \end{cases}$$

To steer traffic away from link j and towards link i, a may be determined by multiplying an adjustment factor $P_{la}$ (which may be termed a lossless-adjustment factor) against the original weighting for link i, i.e.:

$$a = P_{la} w_i$$

$$P_{la} \in ]0,1]$$

For example, a suitable value is 0.02.

The update formula may be rewritten as below:

$$\begin{cases} \hat{w}_i = w_i + P_{la} \cdot w_i \\ \hat{w}_j = w_j - P_{la} \cdot w_i \end{cases}$$

Similarly, to transfer weight from link i and towards link j the update formula may be rewritten as below:

$$\begin{cases} \hat{w}_i = w_i - P_{la} \cdot w_j \\ \hat{w}_j = w_j + P_{la} \cdot w_j \end{cases}$$

A more complex embodiment of our invention would use a PID controller at this stage.

Figure 6C:
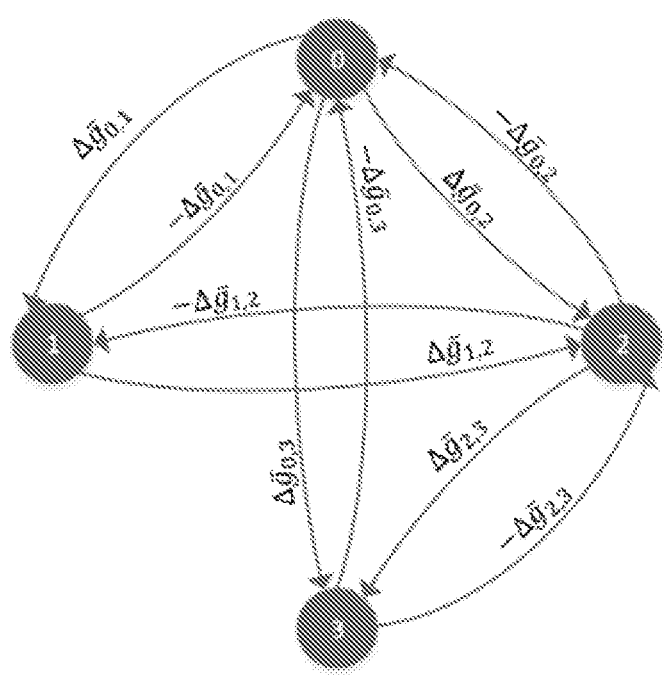
Figure 6D:
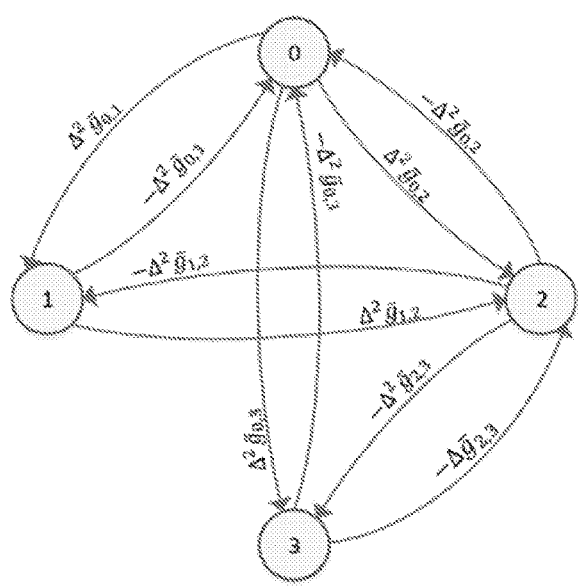

FIG. 6a shows the detail of the method for two links but it will be appreciated that this method may apply to all the links. Accordingly, the collector needs to store values for the (adjusted) global sequence discrepancy and the (adjusted) discrepancy growth for each pair of links. The collector may store this information in a pair of directed graphs, Q and P, examples of which are shown in FIGS. 6c and 6d. In each graph, there will be a vertex for each link. When two packets are received in quick succession, on links i and j, the collector calculates the latency discrepancy, $\Delta \bar{g}$. It will then check the graph in FIG. 6c to see whether there is already an edge in the graph Q connecting i to j. If there is no edge, the collector will add two new edges to graph Q: one from i to j with a value of $\Delta \bar{g}_{new}$, and another from j to i, with a value of $-\Delta \bar{g}_{new}$.

If an edge between i and j is already present in graph Q in FIG. 6c with a value of $\Delta \bar{g}_{prev}$, the collector calculates the latency discrepancy growth, $\Delta^2 \bar{g}_{new} = \Delta \bar{g}_{new} - \Delta \bar{g}_{prev}$. After the latency discrepancy growth is calculated, the values of $\Delta \bar{g}_{new}$, is also updated on graph Q. On graph P in FIG. 6d the collector stores, on each of the graph's edges, an updated value of $\Delta^2 \bar{g}$. For both graphs, the updated value may simply be the new value or alternatively the stored updated value may be an exponential moving average calculated for example using:

$$\Delta^2 \bar{g}_{new} = \frac{\alpha \Delta^2 \bar{g}_{prev} + \Delta^2 \bar{g}_{new}}{(1 - \alpha)}$$

An exponential moving average may smooth out the changing values but it will be appreciated that this is just one option. The latency discrepancy growth we have just calculated, $\Delta^2 \bar{g}_{new}$, is incorporated into the exponential moving average of the edge that connects i to j. For the edge on the opposite direction, from j to i, there is a negative version of the average.

The graphs allow a generalization of the step S606 in FIG. 6a of estimating the latency discrepancy between links i and j, $\Delta \bar{g}_{est}$, provided there is a path of existing measurements between i and j. For a graph where the edges correspond to latency discrepancies, the following property holds: for any cycle, the sum of the edges is equal to zero. To see why this is so, imagine that latency discrepancies between links are akin to height differences, if one imagines someone walking around a path that starts and ends at the same place; it is not hard to see that the sum of all the height differences on that path must be equal to zero.

The number of possible link pairs grows quadratically with the number of links, more specifically, for a link aggregation instance with N links we have $$\frac{N \cdot (N-1)}{2}$$

link pairs. This means that the method used to produce the estimates becomes considerably more relevant when the number of links increases (e.g. for a system with 20 links we have 190 link pairs). The technique may also be applied not only when a given measurement is missing, but also when a measurement is present, but considered outdated.

Figure 7A:
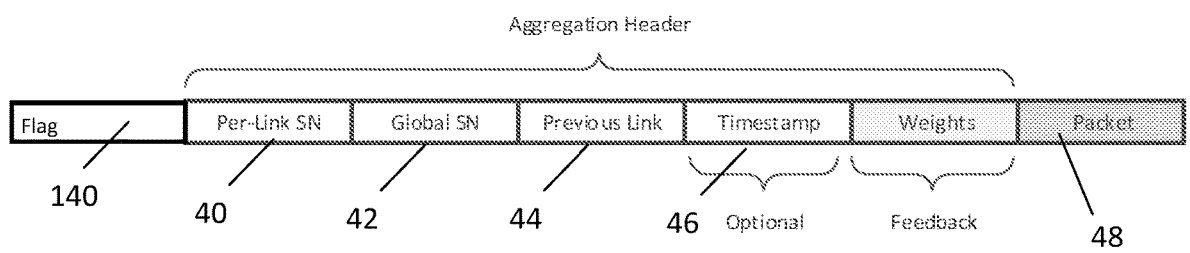
FIG. 7a is an alternative header to be included in a packet being carried through the network.
Figure 7B:
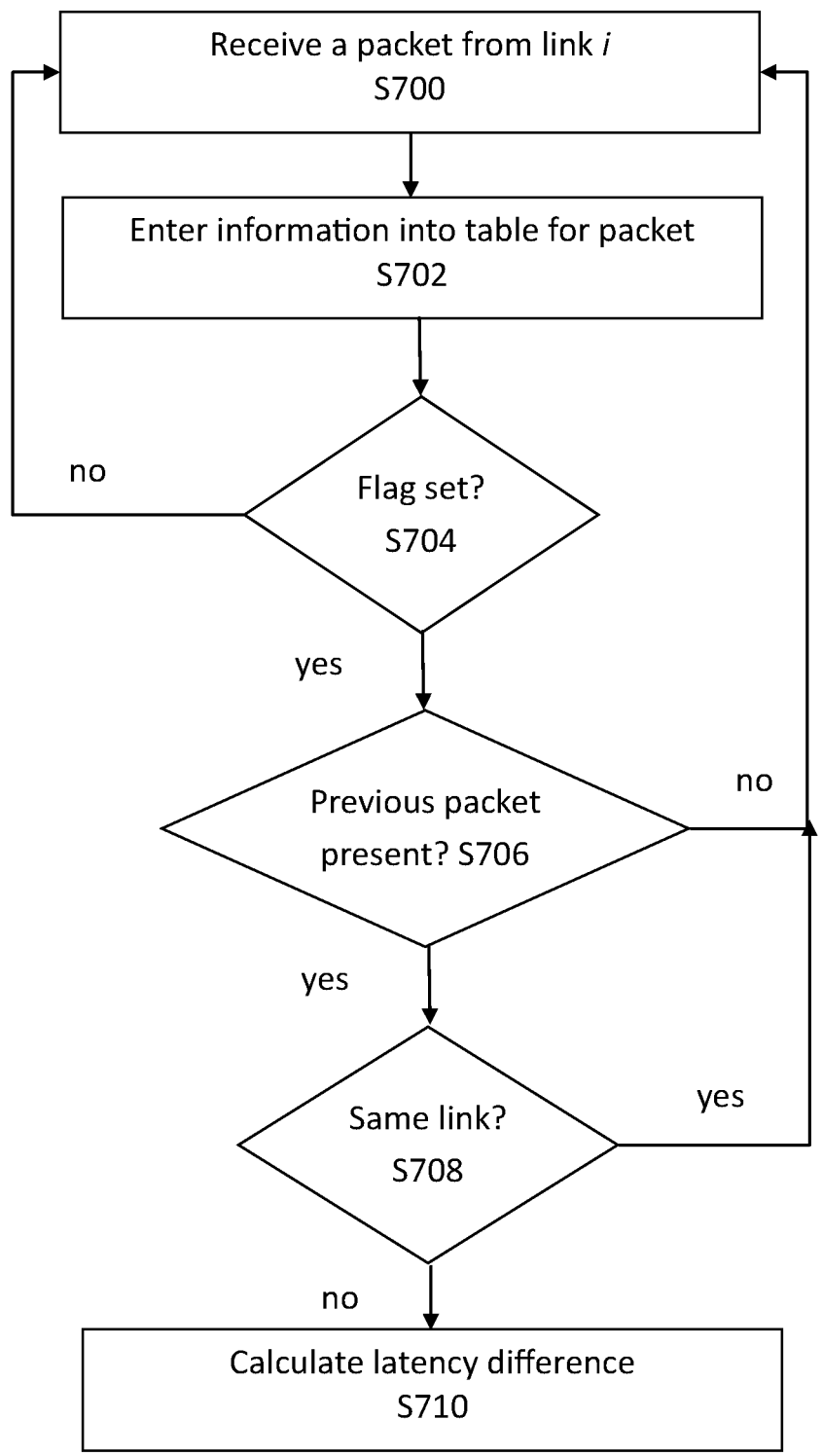
Figure 7C:
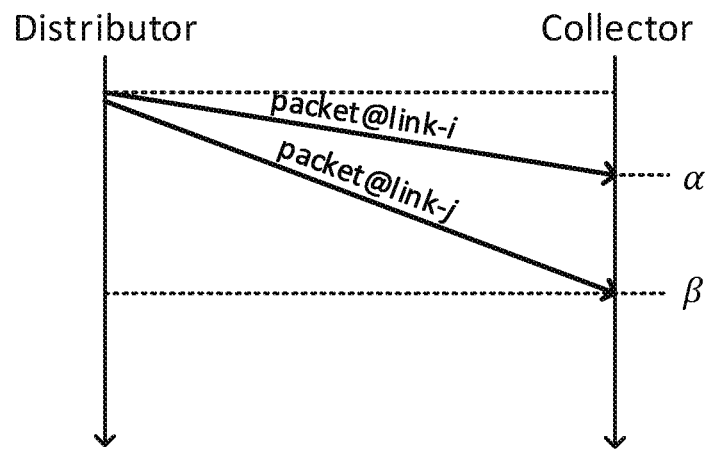
FIG. 7c is an illustration of the timing of a pair of packets used in the method of FIG. 7b.

FIGS. 7a to 7c illustrate a second, more accurate, but also more complex method to measure latency discrepancies between links. This method involves a slight change to the distributor and some additional logic in the collector. FIG. 7a is an illustration of the modified link aggregation header which is needed for this method. As shown, the header includes the features as described above but also needs an extra flag 140 which may be termed "quasi-simultaneous-transmission". This flag 140 indicates whether the previous packet was sent a negligible amount of time before, if not simultaneously, and is added by the distributor when sending the packet.

FIG. 7b shows the steps carried out by the collector. A packet is received on link i in a first step S700. The collector then enters information into a table which is stored in memory on the collector S702. The table comprises information from the link aggregation header in the received packet, in particular the global sequence number and the value of the "quasi-simultaneous-transmission" flag. The collector also enters the number of the link on which the packet was received and the local clock reading at reception time.

The collector then determines if the "quasi-simultaneous-transmission" flag is set on the current packet (step S704). If the flag is not set, the collector returns to the beginning of the process. If the flag is set, the collector determines whether there is information relating to the previous packet in the table by determining whether or not there is a global sequence number in the table which is a single decrease from the global sequence number associated with the packet we have just received. If the global sequence number is not present, the collector returns to the beginning of the process. If the global sequence number is not present the collector determines whether the packet with that number was received on the same link by checking the number of the link in the table. If the link is the same, the collector returns to the beginning of the process to await the next packet. If the links are different the latency difference between the two links is calculated.

FIG. 7c illustrates an example of two packets. The packet received on link j has an associated local clock reading of $\beta$, and the previous packet had a reception time of $\alpha$, and was received on link i. Since both packets were sent almost simultaneously, we can infer that the latency difference $\Delta\bar{g}$ can be calculated as:

$$\Delta\overline{g_{i,j}} = \alpha - \beta$$

The process can then be repeated for subsequent received packets to calculate additional latency differences for additional pairs of links. Additional latency differences may also be calculated by identifying whether the next packet is present in the table, i.e. a packet whose global sequence number is a single increment to the global sequence number associated with the packet we have just received. If this packet is present, and the "quasi-simultaneous-transmission" flag is set, the steps of S706 to S710 may be repeated for a different packet.

The latency difference(s) calculated above may be considered a more accurate version of the latency discrepancy $\Delta\bar{g}$ than the one calculated using the steps of FIG. 6a. As it will be appreciated, a pair of latency differences for the same pair of links can be used to calculate the growth and adjust the traffic as described above in relation to steps S616 and S618. Similarly, the calculated values can be stored in graphs Q and P shown in FIGS. 6c and 6d and subsequently processed as described above.

Dead Link Detection Mechanism

Figure 8B:
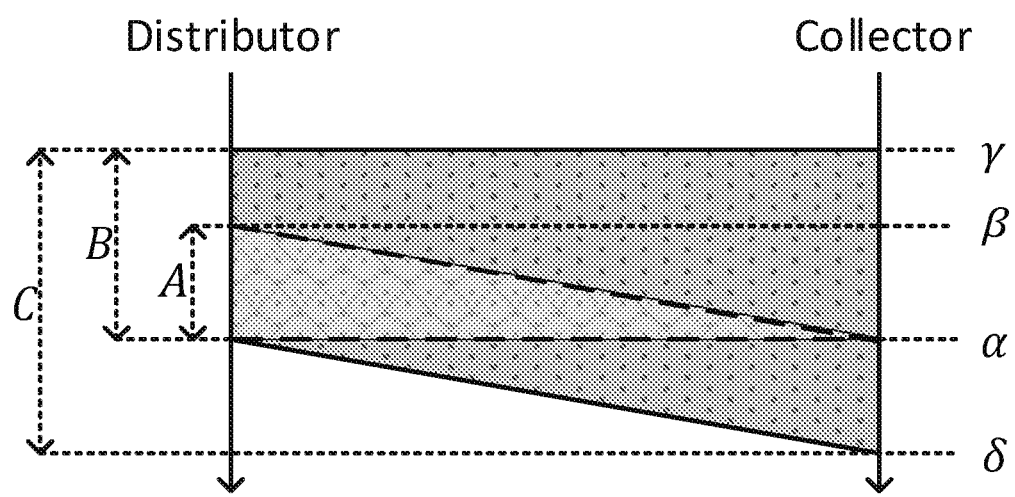
Figure 8A:
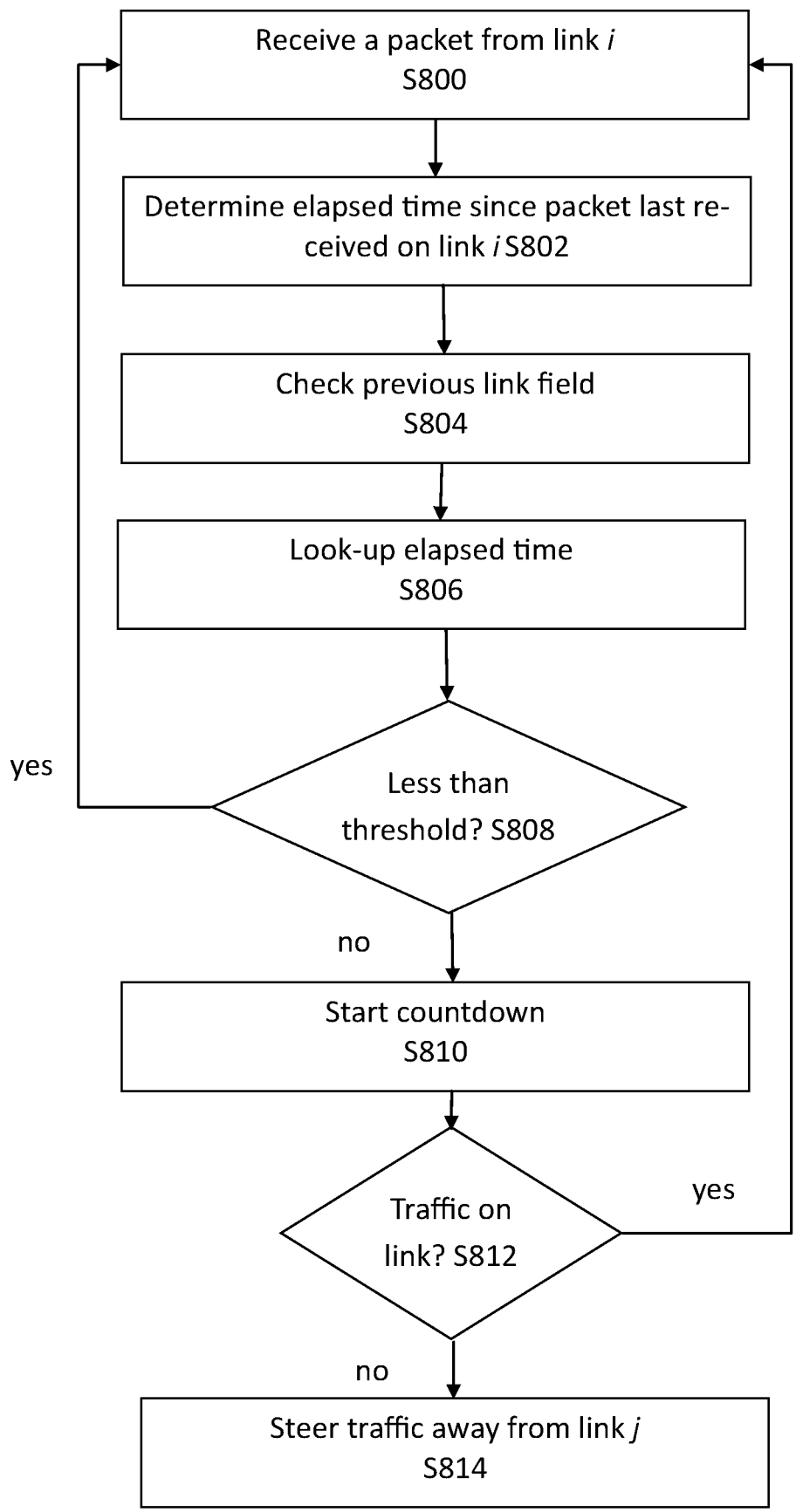
FIG. 8a is a flowchart of the steps carried out by the collector for determining whether there is a dead link.

FIGS. 8a and 8b illustrate a third mechanism which may be used to steer traffic when a link is down. This is helpful because both the packet-loss steering logic and the lossless steering logic described above rely on the presence of traffic to operate.

As shown in FIG. 8a, the method begins when a packet is received on link i (step S800). The next step is to determine how much time has elapsed since the last packet has been received on this link which may be denoted $e_i$ and which may be termed a timestamp for each link i. This value is then stored by the collector. It will be appreciated that this process is repeated for each link so that there is a set of values of the timestamps for all links, i.e.

$$E = \{e_1, e_2, e_3, \ldots e_N\}$$

The next illustrated step (which may happen simultaneously with or before the previous step) is for the collector to look at the "previous link" field on the aggregation header step S806. This field will tell us on which link the previous packet has been sent. If this field indicates that the previous packet was sent on link i, then we know that we should see some traffic on link i. If traffic is not present on link i, it can be inferred that at least one packet-has been lost. As such the dead link detection mechanism will steer traffic away from link i.

To determine whether or not there is traffic on link i, the collector will look up $e_i$ (step S806). This is then compared to a threshold value. If it is smaller than the threshold, there is likely to have been some recent traffic on link i, and thus it can be concluded that the link is not dead. On the other hand, if $e_i \geq$ threshold, the collector will start a countdown (step S810) with a duration of max-latency. The collector will then determine whether there is traffic on link i before this countdown expires (step S812). If traffic is seen, the link is not dead and the process can begin again. If no traffic is received, it can be concluded that at the very least a packet loss event has taken place and traffic is steered away from link i (step S814).

The adjusted set of weights may be defined as:

$$\hat{w}_j(a) = \begin{cases} w_j + a, & i = j \\ w_j - a \cdot \dfrac{w_j}{C - w_i}, & i \neq j \end{cases}$$

where a is a negative adjustment defined by:

$$a = -1 \cdot \min\left(\frac{C}{N}, w_i\right),$$

where C and N are as defined above.

This formula guarantees that a negative weight is not applied, and requires multiple passes of the mechanism to consider a link with a relatively high weight to be dead.

FIG. 8b illustrates a collector receiving a packet a on a given link i at time $\alpha$ from a distributor. The "previous link" field of the link aggregation header tells us that the previous packet, which we will call packet x, has been recently sent over link i. Latency may be assumed to have an upper bound which may be referred to as max-latency (an example value is 40 ms, a worst-case value that is rarely reached). A lower bound, min-latency, is also added which is considered to be zero (without loss of generality, as a latency must always be positive). From these two bounds, given that we have received packet a at time $\alpha$, we know that it must have been sent within the interval A defined by:

$$A = [\alpha - \text{maxlatency}, \alpha - \text{minlatency}] = [\beta, \alpha]$$

The distributor is configured to only fill in the "previous link" field if the previous packet was sent within a recent-thresh threshold. From this, it can be inferred that packet x was sent within the time interval B defined by:

$$B = [\alpha - \text{maxlatency} - \text{recentthresh}, \alpha - \text{minlatency}] = [\gamma, \alpha]$$

Given that packet x was sent within the interval B, it will be received within the interval C defined by $$C = [\alpha - \text{maxlatency} - \text{recentthresh}, \alpha - \text{minlatency} + \text{maxlatency}] = [\gamma, \delta]$$

where $\gamma$ and $\beta$ the start and end times of the threshold on the collector clock.

The threshold which is used in step S808 may be thus be defined as max-latency+recent-threshold threshold. As previously mentioned, when describing the distributor, by default recent-threshold threshold is 0.5 ms. Since max-latency+recent-threshold threshold can be a long time (e.g. 40.5 ms in the example system), the threshold may be replaced by a smaller number, in order to improve the reaction time (e.g. wait 10 ms instead of 40.5 ms). A possible downside is that there may be false positives (i.e. thinking that a packet has been lost, when it fact it is just greatly delayed). It is noted that when considering the threshold, the detected traffic might not be packet x, but some other packet, but for our purposes this does not matter all that much, the important thing is that the link capacity is not zero.

Dead Link Resurrection Mechanism

In all the arrangements above, an optional dead link resurrection mechanism may be included wherein the collector may also determine whether the weight of any given link i has dropped to zero. If the collector identifies a zero weight, the collector will start a countdown with duration of having a value termed resurrect-delay. Once this countdown reaches zero, the collector will set the weight of the dead-link, $w_i$, to the minimum of all the weight's multiplied by a factory $\gamma \in ]0,1]$. The adjusted set of weights may be defined as:

$$\hat{w}_j(a) = \begin{cases} w_j + a, & i = j \\ w_j - a \cdot \dfrac{w_j}{C - w_i}, & i \neq j \end{cases}$$

where a is a negative adjustment defined by:

$$\alpha = \gamma \cdot \min(W),$$

where $\gamma$ is a constant for example 0.25.

Figure 9A:
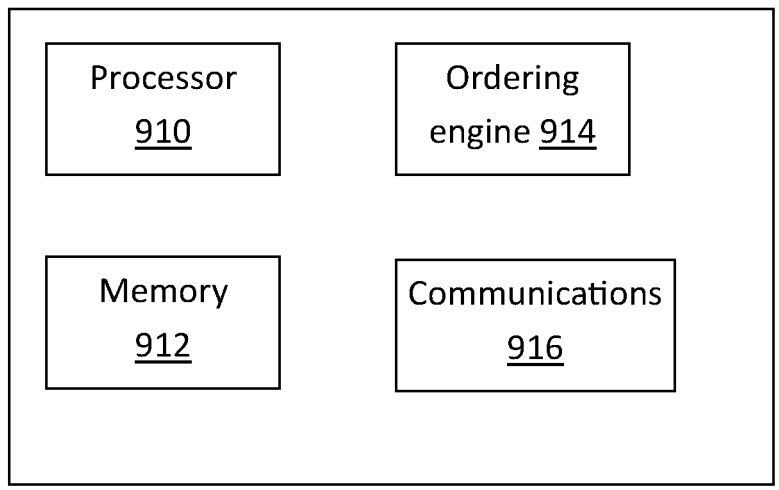
FIGS. 9a and 9b are schematic illustrations of the components within a distributor and a collector respectively.
Figure 9B:
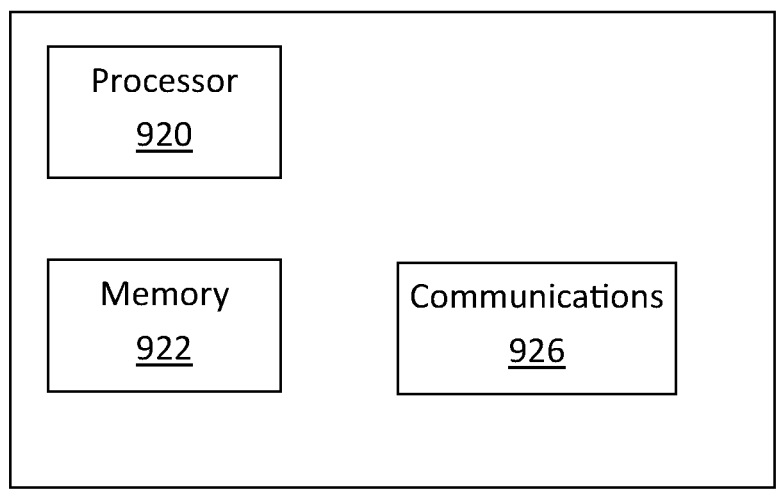

FIGS. 9a and 9b schematically illustrate some of the components of the distributor and the collector. The collector comprises a processor 910 which performs the methods described above. The processor 910 may be implemented in hardware such as a micro-processor, a Field Programmable Gate Array (FPGA) or Application Specific Integrated Circuit (ASIC). The collector also comprises a memory 912 which may comprise volatile and non-volatile memory. The memory 912 may store, for example, the table described with reference to FIG. 7b. As will be appreciated, the order must be preserved as traffic goes through the aggregated link. That is to say, for any two packets, a and b, sent over the aggregated link. If packet a is sent before packet b, packet a should also arrive before packet b. Since links have different latencies, packets may arrive at the collector out-of-order, as such the use of re-order engine 914 is likely to necessary. There are many mechanisms to achieve this and the methods described above are agnostic as to which one is used. Finally, the collector 910 communicates both with the local distributor and the remote distributor and must thus contain a communications module 916.

The components of the distributor mirror those in the collector and comprise a processor 920, memory 922 (e.g. for storing the set of per-sequence numbers and global sequence number) and a communication module 926 for communicating with the local collector and the remote collector.

The link aggregation mechanism described above may be applied regardless of the specific nature of the links, or the exact nature of the substrate on which the associated logic is implemented. It may thus be applicable to the domain of link aggregation on packetized networks, which would include the following scenarios: aggregation over different wireless protocols (e.g. LTE and Wi-Fi; Wi-Fi_____33 and WiGig), aggregation of multiple channels of the same wireless protocol (e.g. multiple Wi-Fi_____33 connections), hybrid aggregation between wireless and wired (e.g. Wi-Fi+Wi-Gig+Ethernet), link aggregation of multiple wired protocols (e.g. DOCSIS+ADSL; multiple ADSL connections; multiple Ethernet connections), and aggregation at the transport layer level when the exact nature of the underlying links is not known. However, as an example, the mechanism may be used to aggregate radio links for example in the point-to-multipoint radio system described in GB2377596 (B), and illustrated in FIG. 9c.

Figure 9C:
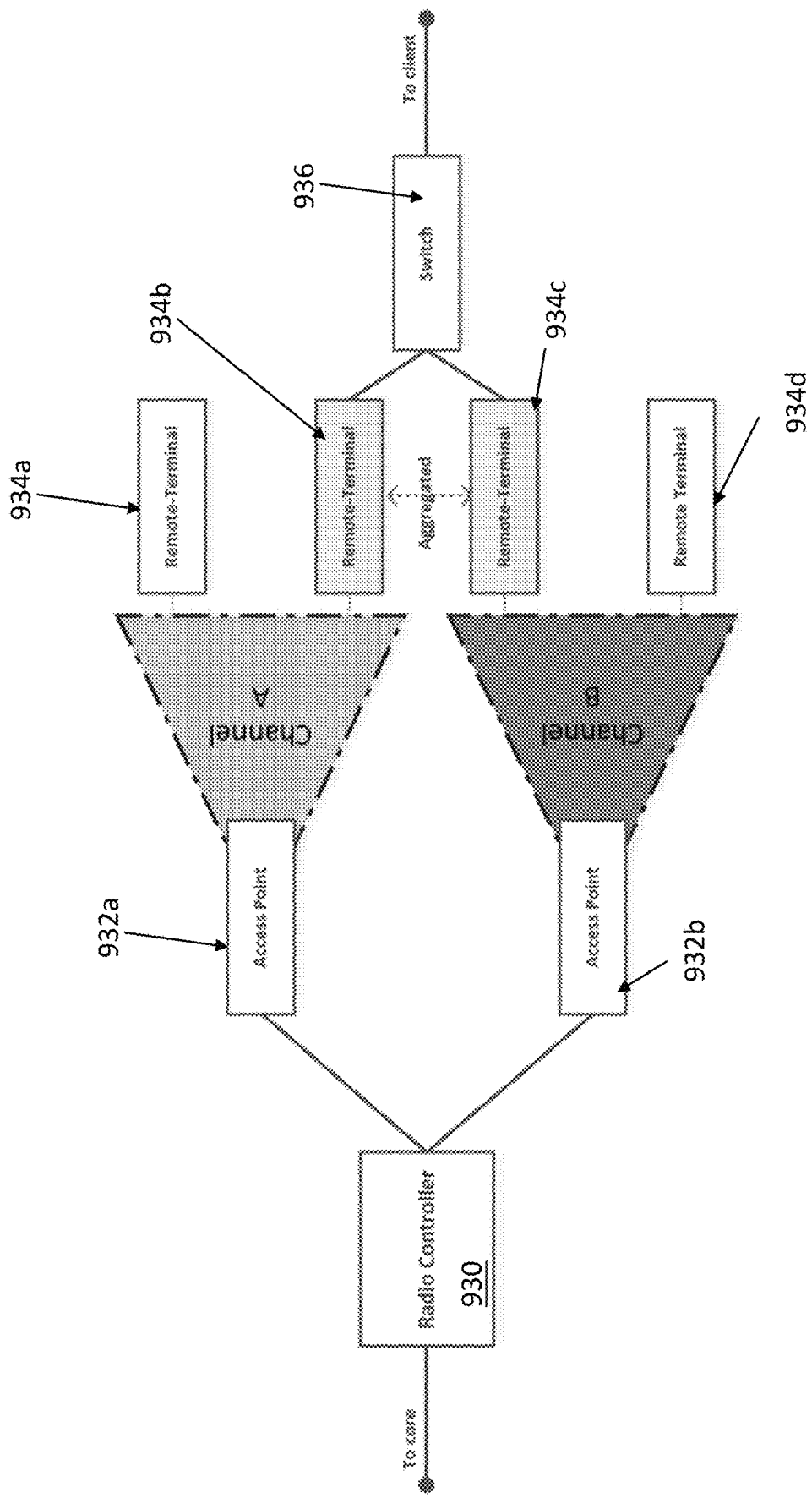
FIG. 9c is a schematic illustration of a system which may incorporate the described distributors and collectors.

FIG. 9c shows a system comprising a radio controller 930, one or more access points 932a, 932b, and one or more remote terminals 934a, 934b, 934c, 934d per access point. The radio controller 930 and access points 932a, 932b may be co-located on a hub-site, whilst the remote terminals may be distributed across a given area. As an example, two of the remote terminals 943b, 934c are co-located and inter-connected through a switch 936 to allow the link aggregation described above to be used.

The distributors and collectors described above reside in radio controller and remote terminals. Each distributor and collector has a processor implemented on FPGAs to implement the methods described above. The link aggregation logic may be present in all remote terminals but dormant until link aggregation is configured. When link aggregation is configured on a group of remote terminals, a leader election procedure takes place, which decides which of the aggregated remote-terminals will take the 'main' role, i.e. the remote-terminal where the collector and distributor logic will be enabled.

Each channel is defined by a triplet comprising of a bandwidth, a modulation, and a band. The bandwidth can be one of the following: 10 MHz, 14 MHz, 20 MHz, 28 MHz, 30 MHz, 40 MHz, 50 MHz or 56 MHz. As for the modulation, each link might use QPSK, 16-QAM, 64-QAM, 128-QAM, 256-QAM or adaptive. Regarding the band, examples include 10.5 GHz, 26 GHz, 27 GHz, 28 GHz, 31 GHz and 39 GHz. It will be appreciated that the method may be applicable to new bandwidths, modulations and bands.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of distributing data packets through a network comprising a plurality of nodes and a plurality of links connecting each pair of nodes, the method comprising:

receiving at least one data packet at a first node from a second node, wherein the first node is connected to the second node via a first plurality of links, determining a current set of weights which are applied by the second node to distribute data packets across the first plurality of links, wherein the current set of weights comprises a current weight for each link in the first plurality of links and wherein the current set of weights are read from a header attached to the at least one data packet;

analysing the at least one data packet which is received at the first node from the second node to determine if the current set of weights are to be adjusted; and when it is determined that the current set of weights is to be adjusted, generating an adjusted set of weights by:
determining an adjustment factor to be applied to the current weight for a selected link in the first plurality of links, wherein the adjustment factor re-distributes the current weight for the selected link among other links in the first plurality of links in proportion to the current weights for all of the other links in the first plurality of links; and
applying the adjustment factor to the current weight for the selected link and at least one other current weight in the current set of weights;

wherein analysing the at least one data packet comprises analysing using lossless steering logic;

wherein analysing the at least one data packet further comprises:

determining which link a first data packet was received on;

obtaining a first timestamp for the first data packet, the first timestamp indicating a time at which the first data packet was sent from the second node;

obtaining a second timestamp for the first data packet, the second timestamp indicating a time at which the first data packet was received at the first node;

determining when a second data packet is received on the same link as the first data packet;

obtaining a third timestamp for the second data packet, the third timestamp indicating a time at which the second data packet was sent from the second node;

obtaining a fourth timestamp for the second data packet, the fourth timestamp indicating a time at which the second data packet was received at the first node; and calculating, using the first, second, third and fourth timestamps, a latency difference value which is representative of a latency condition on the link on which the first and second data packet was received.

2. The method of claim 1, wherein analysing using lossless steering logic comprises using a remote and a local timestamp for each of two data packets received on a single link to calculate a latency difference value; wherein the remote timestamp represents the time at which each data packet was sent, the local timestamp represents the time at which each data packet was received and the latency difference value is representative of the latency on the single link.

3. The method of claim 2, comprising storing a set of latency difference values comprising the most recently calculated latency difference value for each link.

4. The method of claim 2, wherein determining that the current set of weights are to be adjusted, comprises comparing the latency difference value to a latency growth threshold and when the latency difference value is greater than the latency growth threshold, applying a latency growth penalty factor as the adjustment factor.

5. The method of claim 1, wherein calculating the latency difference value comprises: calculating a first latency value by subtracting the first timestamp from the second timestamp;

calculating a second latency value by subtracting the third timestamp from the fourth timestamp; and calculating the latency difference value by subtracting the first latency value from the second latency value.

6. The method of claim 5, comprising storing a set of latency values comprising the most recently calculated latency value for each link.

7. The method of claim 1, wherein analysing the at least one data packet comprises:

determining when a link is not functioning properly within the network; and when it is determined that a link is not functioning, generating an adjusted set of weights to adjust the weight of the non functioning link by the adjustment factor.

8. The method of claim 7, comprising determining a link is not functioning by:

determining that the time which has elapsed between receipt of a pair of packets on the same link is higher than a threshold;

in response to the determining that the time is higher than the threshold, monitoring for receipt of a packet on the same link within a countdown; and when no packet is received within the countdown, determining that the link is not functioning properly.

9. The method of claim 7, comprising determining a link is not functioning by:

determining that a weight within the set of weights is zero;

in response to the determining that the weight is zero, starting a countdown; and once the countdown reaches zero, increasing the weight of the zero weighted link in proportion to the lowest weight in the set of weights.

10. The method of claim 1, wherein applying the adjustment factor to the current weight comprises one of:
adding the adjustment factor to the current weight for the selected link to increase the amount of traffic which is distributed across the selected link or
subtracting the adjustment factor from the current weight for the selected link to decrease the amount of traffic which is distributed across the selected link.

11. The method of claim 10, wherein the adjustment factor is applied to all the other current weights in the current set of weights so that each current weight in the current set of weights is adjusted in proportion to a respective current weight value thereof.

12. The method of claim 10, wherein the adjustment factor is applied to only one other current weight in the current set of weights so that each remaining current weight in the current set of weights has a mutually matching current weight value.

13. A collector in a first node in a network comprising a plurality of nodes, wherein the collector is configured to carry out the steps of claim 1.

14. A distributor in a second node in a network comprising a plurality of nodes, the distributor comprising a processor which is configured to
apply a current set of weights when sending at least one data packet to the collector of claim 13;
receive an adjusted set of weights from the collector; and
apply the adjusted set of weights when sending subsequent data packets to the collector.

15. The distributor of claim 14, wherein the processor is further configured to add a header to a data packet before sending the data packet, wherein the header comprises a plurality of header values including at least one of a global sequence number, a set of per-link sequence numbers, a previous link field and a timestamp.

16. The distributor of claim 14, wherein the processor is further configured to reset each of the header values in a reset phase and subsequently update each of the header values when a data packet is sent.

17. A method of distributing data packets through a network comprising a plurality of nodes and a plurality of links connecting each pair of nodes, the method comprising:
receiving at least one data packet at a first node from a second node, wherein the first node is connected to the second node via a first plurality of links,
determining a current set of weights which are applied by the second node to distribute data packets across the first plurality of links, wherein the current set of weights comprises a current weight for each link in the first plurality of links and wherein the current set of weights are read from a header attached to the at least one data packet;
analysing the at least one data packet which is received at the first node from the second node to determine if the current set of weights are to be adjusted; and
when it is determined that the current set of weights is to be adjusted, generating an adjusted set of weights by:
determining an adjustment factor to be applied to the current weight for a selected link in the first plurality of links, wherein the adjustment factor re-distributes the current weight for the selected link among other links in the first plurality of links in proportion to the current weights for all of the other links in the first plurality of links; and
applying the adjustment factor to the current weight for the selected link and at least one other current weight in the current set of weights;
wherein analysing the at least one data packet comprises analysing using lossless steering logic;
wherein analysing using lossless steering logic comprises calculating a discrepancy growth value between a first pair of data packets received within a threshold time on a pair of links and a second pair of data packets received on the same pair of links within the threshold time, wherein the discrepancy growth value is representative of the latency on the links on which the first and second pairs of data packets were received.

18. The method of claim 17, wherein calculating the discrepancy growth value comprises:
calculating a first global sequence discrepancy value for the first pair of data packets; and
calculating a second global sequence discrepancy value for the second pair of data packets; and
calculating the discrepancy growth value by subtracting the first global sequence discrepancy value from the second global sequence discrepancy value.

19. The method of claim 18, wherein analysing the at least one data packet comprises:
obtaining a first global sequence number for a first data packet in the first pair of data packets;
obtaining a second global sequence number for a second data packet in the first pair of data packets;
obtaining a third global sequence number for a first data packet in the second pair of data packets;
obtaining a fourth global sequence number for a second data packet in the second pair of data packets;
calculating, using the first, second, third and fourth global sequence numbers, a discrepancy growth value which is representative of the latency on the links on which the first and second pairs of data packet were received.

20. The method of claim 19, wherein the first global sequence discrepancy value is calculated by subtracting the first global sequence number from the second global sequence number; and the second global sequence discrepancy value is calculated by subtracting the third global sequence number from the fourth global sequence number.

21. The method of claim 20, further comprising:
obtaining the first and second global sequence numbers in response to determining that the first pair of packets has been received within the threshold time by determining that a difference between times of receipt for both the data packets in the first pair of packets is lower than the threshold time and
obtaining the third and fourth global sequence numbers in response to determining that the second pair of packets has been received within the threshold time by determining that a difference between times of receipt for both the data packets in the second pair of packets is lower than the threshold time.

22. The method of claim 18, wherein the first global sequence discrepancy value is calculated by subtracting the time of receipt of the second data packet in the first pair of data packets from the time of receipt of the first data packet in the first pair of data packets; and the second global sequence discrepancy value is calculated by subtracting the time of receipt of the second data packet in the second pair of data packets from the time of receipt of the first data packet in the second pair of data packets.

23. The method of claim 22, further comprising:
obtaining the first and second global sequence numbers is in response to determining that the second data packet in the first pair of packets was received with a flag indicating that the second data packet was sent within the threshold time of the first data packet in the first pair of packets and obtaining the third and fourth global sequence numbers is in response to determining that the second data packet in the second pair of packets has been received with a flag indicating that the second data packet was sent within the threshold time of the first data packet in the second pair of packets.

24. The method of claim 23, wherein calculating, using the first, second, third and fourth global sequence numbers, a discrepancy growth value comprises using the first, second, third and fourth global sequence numbers to identify the first and second pairs of data packets.

25. A method of distributing data packets through a network comprising a plurality of nodes and a plurality of links connecting each pair of nodes, the method comprising:

receiving at least one data packet at a first node from a second node, wherein the first node is connected to the second node via a first plurality of links, determining a current set of weights which are applied by the second node to distribute data packets across the first plurality of links, wherein the current set of weights comprises a current weight for each link in the first plurality of links and wherein the current set of weights are read from a header attached to the at least one data packet;

analysing the at least one data packet which is received at the first node from the second node to determine if the current set of weights are to be adjusted; and when it is determined that the current set of weights is to be adjusted, generating an adjusted set of weights by:

determining an adjustment factor to be applied to the current weight for a selected link in the first plurality of links, wherein the adjustment factor re-distributes the current weight for the selected link among other links in the first plurality of links in proportion to the current weights for all of the other links in the first plurality of links; and applying the adjustment factor to the current weight for the selected link and at least one other current weight in the current set of weights;

wherein analysing the at least one data packet comprises:
determining when a link is not functioning properly within the network; and when it is determined that a link is not functioning, generating an adjusted set of weights to adjust the weight of the non-functioning link by the adjustment factor;

wherein determining a link is not functioning comprises:
determining that the time which has elapsed between receipt of a pair of packets on the same link is higher than a threshold;

in response to the determining that the time is higher than the threshold, monitoring for receipt of a packet on the same link within a countdown; and when no packet is received within the countdown, determining that the link is not functioning properly.

* * * * *